United States Patent [19]

Klingman

[11] Patent Number: 5,950,172

[45] Date of Patent: Sep. 7, 1999

[54] SECURED ELECTRONIC RATING SYSTEM

[76] Inventor: Edwin E. Klingman, 300 Hwy. 84, San Gregorio, Calif. 94074

[21] Appl. No.: 08/684,135

[22] Filed: Jul. 19, 1996

Related U.S. Application Data

[63] Continuation-in-part of application No. 08/660,529, Jun. 7, 1996, Pat. No. 5,729,594.

[51] Int. Cl.⁶ .................................................. G06F 17/60
[52] U.S. Cl. ............................................................ 705/26
[58] Field of Search ............................. 379/92.01, 92.02; 705/10, 26, 27; 380/21

[56] References Cited

U.S. PATENT DOCUMENTS

| | | | |
|---|---|---|---|
| 4,799,156 | 1/1989 | Shavit et al. ............................. | 705/26 |
| 5,181,238 | 1/1993 | Medamana et al. ................. | 379/93.03 |
| 5,636,282 | 6/1997 | Holmquist et al. ...................... | 380/25 |
| 5,692,132 | 11/1997 | Hogan ...................................... | 705/27 |

OTHER PUBLICATIONS

Brian North, North Brewery Supplies (Internet Home Page), Dec. 1995.

Cytex Corporation (Internet Home Page), May 12, 1996.

Joe Mullich, "It's Nothing Automatic: New off-the-shelf customer service management software promises increased profits. Serious integration chalenges, too", Open Computing, p. 46, Feb. 1995.

Alan Radding, "Press 1 for Savings; computer-integrated telephony improves customer service while cutting costs.", MIDRANGE Systems, p. 17, Jul. 5, 1994.

*Primary Examiner*—Emanuel Todd Voeltz
*Assistant Examiner*—Alexander Kalinowski
*Attorney, Agent, or Firm*—Claude A. S. Hamrick; Oppenheimer W. Donnelly

[57] ABSTRACT

A remote communication system for facilitating secure on-line evaluation of goods based upon consumers' satisfaction through electronic media wherein a suitable local user input device in association with a data transmission system, couples the user input to a packet network system for communicating to a remote receiver/decoder apparatus to obtain potentially desired scoring information such as an electronic evaluation form regarding a previously purchased product. Upon selection of scoring option by the user, a telcom network communication link for communicating a telephone number associated with the desired product from the user to the remote receiver allows the user to score the desired product. The telcom connection, linking the user input device to the remote server device may also include a toll-free 800 telephone number system to encourage shoppers to perform evaluations of purchased product without incurring costs associated therewith. During the telcom connection, a buyer identification number may be used to limit rating input to one evaluation per buyer thereby increasing accuracy of product evaluation.

21 Claims, 10 Drawing Sheets

SECURED ELECTRONIC RATING SYSTEM

CROSS REFERENCE TO RELATED APPLICATION

This application is a continuation in part of my prior application Ser. No. 08/660,529, filed Jun. 7, 1996, now U.S. Pat. No. 5,729,594 entitled "ON-LINE SECURED FINANCIAL TRANSACTION SYSTEM THROUGH ELECTRONIC MEDIA".

BACKGROUND OF THE INVENTION

1. Field of the Invention

The present invention relates generally to electronic financial transaction communication systems and more particularly to a system providing secure rating information using means available on most telephone equipment, either POTS (plain old telephone system) or ISDN (integrated services digital network), based upon consumers' satisfaction relating to products purchased through electronic transmission media such as the Internet. The system may be generalized to provide a secure weighted voting system based on a voters list indexed with or keyed to, caller IDs.

2. Description of the Prior Art

More recently, electronic cash transactions have gained desirability with a particular emphasis on conducting such transactions on the Internet. The advent of electronic cash transactions has led to rapid popularity of electronic shopping. Electronic shopping on the Internet appears to be the wave of the future inevitably replacing much of today's paper catalog shopping and perhaps even in-person shopping. This recent trend lends itself particularly well to shopping for software type of products in particular, due to the user's opportunity to try a demonstration or sample of the software product prior to making its purchase.

Providing shopping opportunities to users of the Internet media, may necessitate a method and/or means for providing purchasers of Internet products with an opportunity to rate the particular products purchased. This can be very useful to the seller of the product in terms of providing input or feedback regarding the product. Moreover, where consumers' feedback regarding a product is favorable to the seller, scoring or rating information can be a very effective marketing tool for the seller. Additionally, potential customers may gain more insight from such information prior to purchasing products.

The basic difficulty that exists with today's financial transactions on the Internet transmission media is security and privacy concerns resulting from the easily readable nature of electronic information being transferred on such media. As messages move across the Internet, they can easily pass through many numbers of computers, any one of which can be utilized to copy the messages. Where rating information relating to a product is made available on the Internet, there needs to be added security measures taken to prevent tampering of such information. For example, to promote sales of his/her product, a merchant may be tempted to manipulate rating information available to the Internet users regarding the marketed product.

To address security concerns, current solutions generally employ encryption techniques. In fact, almost all cash transaction schemes depend on encryption for privacy and security enforcement, as will be discussed in greater detail shortly.

Among other reasons, encryption is generally used to (1) protect information such as credit card numbers, (2) establish identity of either the merchant or the buyer, (3) verify information, and (4) provide electronic signatures that are legally binding and not likely to be forged. To this end, both public key and private key encryption or decryption schemes are deployed. Private key schemes depend upon a single "shared secret" for encryption and decryption while public key schemes publish one key and maintain another key as confidential. However, the downfall in employing these schemes as stated in the April, 1996 issue of *Business Communication Review* (page 4) is the requirement for a unique key associated with each user which results in not merely hundreds rather literally millions of encryption keys.

Models for secured digital money transactions currently seem to fall into two basic categories, credit card sales and digital travelers checks. Both categories depend upon encryption for security. A useful text describing prior art is Digital Money by Dan Lynch and L. Lundquist published by John Wiley & Sons 1996 ISBN 0-471-14178-X. A brief summary of several digital money transaction schemes is also found in the May 1996 issue of *WebSmith Magazine* in an article entitled "Digital Cash." An example of a prior art digital money transaction is where the subscriber using "touchtone" or personal computer and modems (not through the Internet) sends payment information to a company by the name of CheckFree who in turn uses the existing U.S. Federal Reserve or MasterCard RPS System to transfer funds electronically from the subscriber's checking account to the creditor, or in some cases, a check is forwarded through the U.S. Post Office. The transaction is ultimately recorded on bank statements or cancelled checks. CheckFree's subscription software on the PC keeps track of transactions and telephone subscribers receive a monthly statement.

Several prior art digital money transaction schemes in use today are listed and described in the U.S. patent application entitled "On-Line Secured Financial Transaction System Through Electronic Media" with Ser. No. 08/660,559, filed on Jun. 7, 1996 now U.S. Pat. No. 5,729,594 to which this is a continuation-in-part application and which is herein incorporated by reference.

Much of the same problems that exist in prior art scheme relative to the above-referenced patent application also exist in offering secure electronic rating information. A common difficulty among prior art schemes arise from connecting the transacting parties to the existing banking network. In FIG. 1, we observe that CyberCash, an electronic financial transaction scheme, exists as an interface layer connecting CyberSpace to Banking Space (Banking Net in FIG. 1). Layered architectures are of considerable importance. In 1979 the United Nations CCITT (now the ITU=International Telephony Union) International Standards Organization (ISO) began work on the Open Systems Interconnection (OSI) architecture. The Seven Layer OSI standard model was published in 1984. (See Uyless Black: "OSI-A Model for Computer Communication Standards", Prentice Hall 1991, ISBN 0-13-637133-7). In the abstract, the Financial layer is the same as any layer in the abstract, such as the Physical layer, the Data Link layer, the Network layer, the Transport layer, the Session layer, the Presentation layer or the Application layer. Prior art schemes interface the Financial layer to the TCP/IP transport layer, thus forsaking real network addresses and physical space for virtual Internet Protocol (IP) addresses in CyberSpace. When the Financial layer interfaces to the Transport layer, financial transactions occur between two Internet nodes (the client and the merchant server) whose IP addresses exist in CyberSpace.

This is shown in FIG. 2 where the client 10 conducts financial transactions with the merchant server 12 through the Financial layer 14. Between the local client system (not shown) and Physical layer 16, sequentially reside Application layer, Transport layer 20, Network layer 22 and Data Link layer 24. Financial layer 14 interfaces to Transport layer 20.

To further appreciate some of the drawbacks of prior art schemes for financial transactions, an understanding of network connectivity is necessary. There are primarily two types of networks in use today, switched and packet networks. Most voice communications (telephone lines, fax derivatives, etc.) use switched networks, while most Internet data communications, including packetized voice and video, employ packet routing networks. The switch network establishes a connected network by switching physical links until an end-to-end path exists from the caller to the called party. This obviously entails distance-base pricing for establishing the connected network.

A packet network (connectionless network) such as used in the Internet media, routes packets from node-to-node over local links until the destination is reached or the number of hops is exceeded. Each hop is almost free of cost. Therefore, the cost of packet communications is distance independent. The source and destination addresses are key to connectionless or packet communications. However, these addresses are not secure. The destination address can be changed and information re-routed or the source address can be changed for anonymity via re-mailers. Information cast into the packet network is, on the other hand, low cost, yet high risk.

It is key to note that connected lengths in switched networks, have physical source and destination addresses, and these physical addresses (especially wired local loops) provide a degree of security and, if desired, lack of anonymity that is valuable in a business sense.

The typical Internet communication is through the switched network to a packet router. All communications proceed through both the switch network and the packet routing Internet network. This is effective, but does not make full use of the distinct features associated with each type of network. Prior art schemes for conducting financial transactions employ multi-network schemes having both switch and packet routing. The switched network is primarily only a means for connecting to the Internet. This limited use of the switched network completely discounts and ignores the advantages, i.e., the inherent privacy and security of a switched end-to-end connection, associated with switched network systems. The inherent privacy and security of a switched end-to-end connection between physical addresses is the goal of prior art schemes using encryption and digital signatures which are employed as an attempt to accomplish in CyberSpace the functions accomplished by the built-in financial mechanisms of the 800/900/XXX directory number systems.

As one might expect, with the increasing number of Internet users, the Internet is overflowing with free information. When information can be easily sold over the Internet, the quantity of information on the same will explode. Consumers need a means to evaluate products before buying, a need filled in the print world, by "Consumer Reports", "Movie Reviews", and similar publications that advise potential consumers of the relative quality of the products that are for sale.

In Cyberspace, information can be both generated and distributed almost at no cost, thus there will be far more information than the most efficient critic or scorer can handle.

In today's world there are many instances in which accepted scoring mechanisms are manipulated when they clearly should not be so manipulated. Recently, a major "Top Ten" list of books was manipulated by a complex ordering scheme where books were ordered in large quantities and distributed over many locations for the purpose of distorting the records relating to book orders. This resulted in the book in question being rated with higher scores in the "Top Ten" lists than actual purchases would warrant. The result was that many people were erroneously led to purchase the book based on its position in the list, rather than on the actual "quality" of the book. It is important to design security into any scoring system that will be used to guide peoples' buying behavior.

Accordingly, the need exists for a secure communication scheme for 1) evaluating products purchased through electronic or otherwise financial transactions and 2) providing such evaluation or rating information to those perhaps interested in purchasing a marketed product.

SUMMARY OF THE INVENTION

It is therefore a principal objective of the present invention to provide an on-line communication system for securely communicating rating information based upon consumers' satisfaction relating to a product purchased through electronic media or otherwise. Another objective of the present invention is to provide a system of the type described to maintain the rating information in a private and secure environment in order to prevent tampering, interference with or destruction of the rating information.

It is yet another objective of the present invention to provide a system of the type described which uses a toll-free telephone numbering system such as an '800' numbering system to provide a means for providing rating information related to products purchased through the electronic media.

Still another objective of the present invention is to provide a system of the type described allowing users of the Internet transmission media to access information relating to the evaluation of a desirable product.

It is a further objective of the present invention to provide an on-line financial transaction scheme based upon a multi-network solution in which the distinction between switched and packet routing networks are used to optimally partition functionality.

It is another objective of the present invention to provide a system wherein small-shop software developers can market their products to the public inexpensively.

It is yet another objective of the present invention to provide a financial transaction system employing point-to-point protocol (PPP), thereby allowing any hardware or operating system to negotiate a common information transfer protocol with dissimilar hardware and operating systems software.

Briefly, a preferred embodiment of the present invention includes a remote communication system for facilitating secure on-line evaluation of goods based upon consumers' satisfaction through electronic media wherein a suitable local user input device in association with a data transmission system, couples the user input to a packet network system for communicating to a remote receiver/decoder apparatus to obtain potentially desired scoring information such as an electronic evaluation form regarding a previously purchased product. Upon selection of scoring option by the user, a telcom network communication link for communicating a telephone number associated with the desired product from the user to the remote receiver allows the user to score the desired product. The telcom connection, linking the user input device to the remote server device may also include a toll-free 800 telephone number system to encourage shoppers to perform evaluations of purchased product without incurring costs associated therewith. During the telcom connection, a buyer identification number may be used to limit rating input to one evaluation per buyer thereby increasing accuracy of product evaluation.

These and other objects and advantages of the present invention will no doubt become apparent to those skilled in the art after having read the following detailed description of the preferred embodiments illustrated in the several figures of the drawing.

IN THE DRAWINGS

DETAILED DESCRIPTION OF THE PREFERRED EMBODIMENTS

Figure 1:
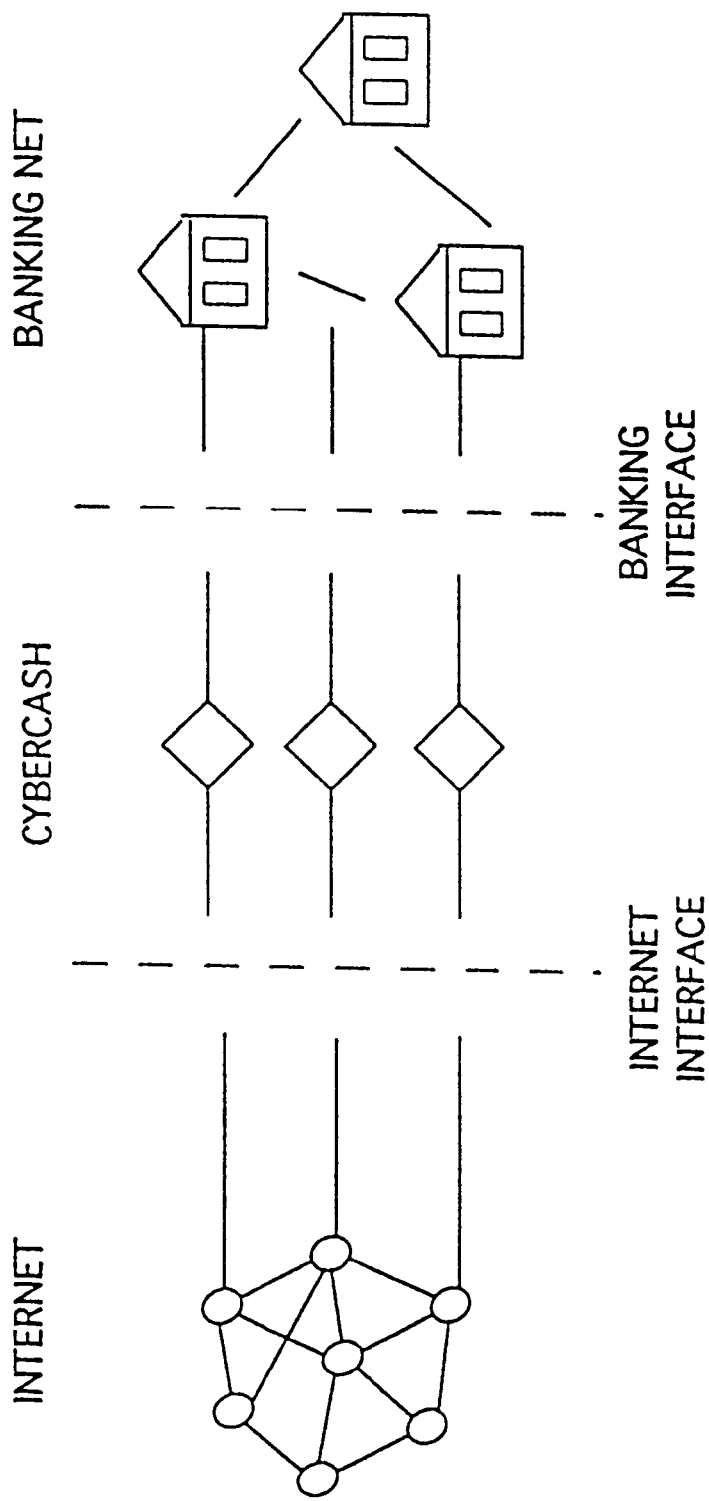
FIG. 1 depicts a prior art CyberCash financial scheme where the Internet is interfaced to the Banking Net.
Figure 2:
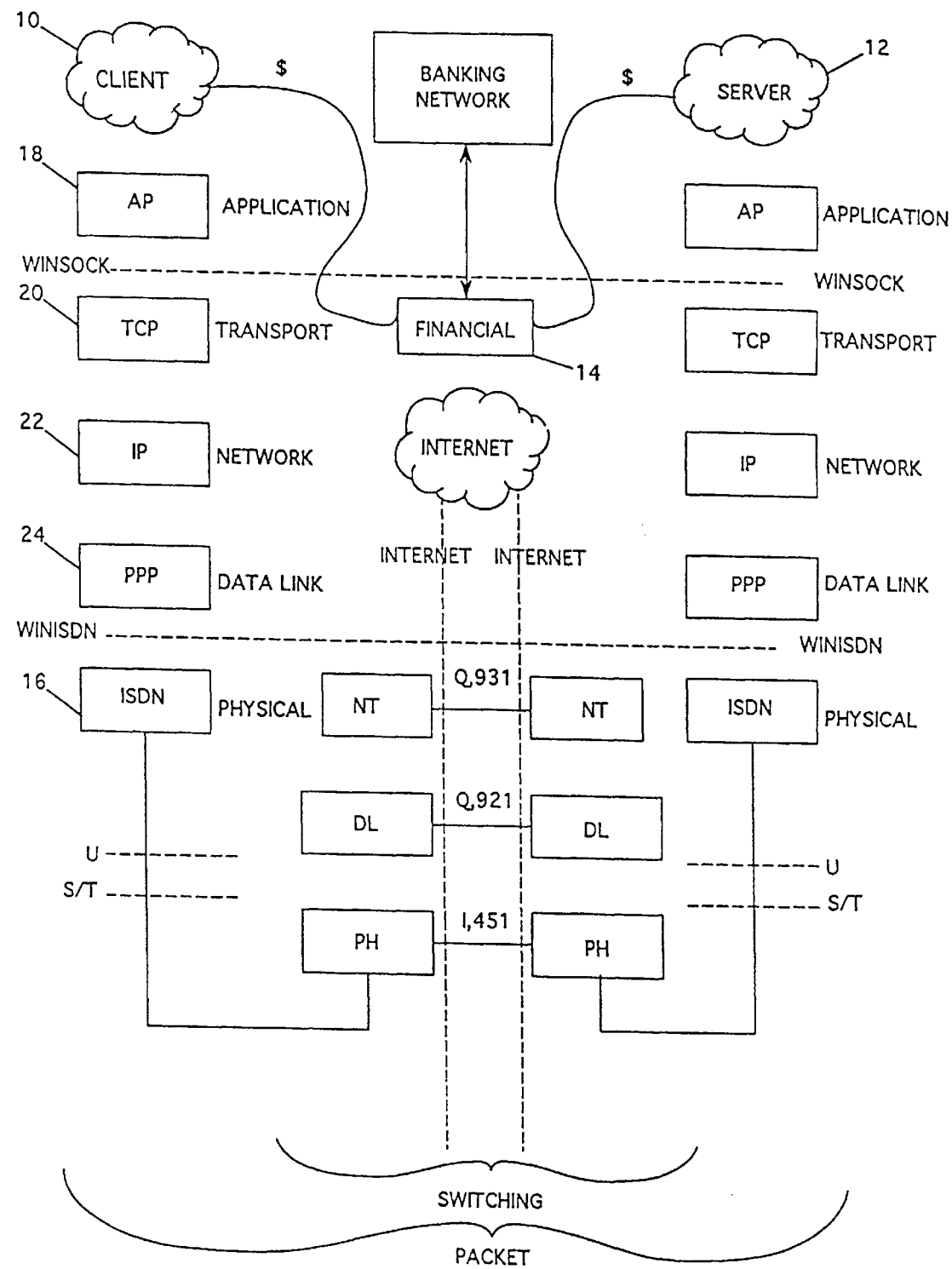
FIG. 2 depicts prior art on-line financial schemes interfacing the Financial layer to the Transport layer.
Figure 3:
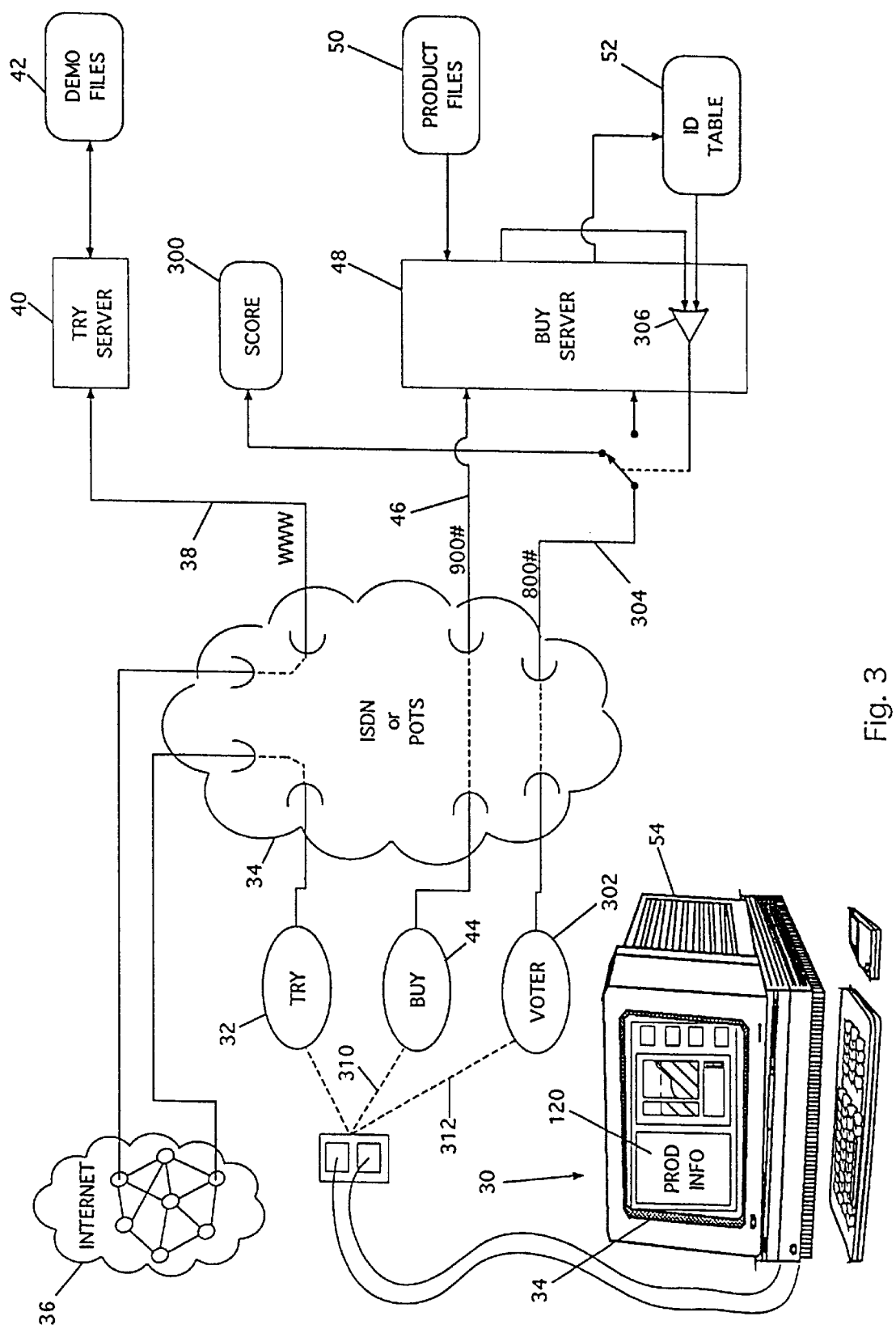
FIG. 3 shows a preferred embodiment of an overall diagram of the financial transaction system employing rating evaluation schemes used in the present invention.

Referring now to the drawing, FIG. 3 shows in conceptual diagrammatic form two channels, 'TRY' and 'BUY,' for establishing communications between a user and a remote system. As such, a user input device or subsystem 30 and a TRY local telcom connection 32 are connected through a switching system or network 34 and Internet transmission media 36 to a TRY remote telcom connection 38 which couples to a remotely located subsystem TRY server 40. This communication path may be used when a user wishes to browse the web page of a product that is of interest through the Internet transmission media. TRY server 40 accesses files from demo file storage location 42 in which demonstration files reside. TRY sensor 14 may also access and communicate back to the user toll-free and/or toll-telephone numbers to be used in establishing additional communication paths between the local subsystem 30 and a remote subsystem as will be further explained below. TRY server 40 may also access score information location 300 for retrieval of recent evaluations relating to a product of interest to a user.

In communication path 310, user input subsystem 30 is additionally coupled through a BUY local telcom connection 44 through switching network 34 and a BUY remote telcom connection 46 to a remotely located subsystem BUY server 48. Communication path 310 may be used when a user decides to purchase a product in the form of electronic data wherein the telephone or switched network using a telephone toll number such as from a '900' numbering system is used. BUY server 48 may access files from product file storage location 50 in which electronic information such as software data presented for sale is stored, particularly during the purchase of an electronic product. BUY server 48 may also access ID table storage location 52 for storing caller identification numbers and retrieving the same for verification purposes. During the purchase of a product, the buyer's (or user's) system identification number such as a Caller ID number is stored in ID table 52 by BUY server 48. ID table 52 accordingly, stores and maintains a voter list.

In communication 312, user input subsystem 30 is further coupled to voter local telcom connection 302 through switching network 34, a voter remote telcom connection 304 and switch 308 to BUY server 48. Switch 308 is in turn, coupled to score information location 300 and the output of comparator 306. That is, depending upon the state of the output of comparator 306, voter remote telcom connection 304 may or may not be able to provide information to score location 300 through switch 308. Comparator 306 receives its inputs from BUY server 48 and ID table 52.

Communication path 312 may be used when a voter decides to input an evaluation rating related to a product wherein the telephone or switched network using a toll-free telephone number such as from an '800' numbering system is used. When a voter decides to vote and calls the corresponding '800' number to do so, the voter's Caller ID number(or buyer's Caller ID in the case where a previous buyer wishes to evaluate the product he/she purchased earlier) is compared by comparator 306 to a voter list residing in ID table 52. If the in-coming Caller ID number matches one of the ID numbers in the voter list, switch 308 allows the voter's input to be entered into score information location 300. Otherwise, the voter's input is not allowed into score location 300.

While switch 308 and comparator 306 are shown as hardware components in FIG. 3, it should be obvious to those of ordinary skill in the art that the functions of these components may be performed in hardware or software. Furthermore, switch 308 may physically reside in BUY server 48 in which case BUY server 48 is directly coupled to score location 300. Additionally, in FIG. 3, the communication paths 310 and 312 are shown as two physically different links, however, they may be physically one and the same path. For example, the telephone line that is utilized to place a '900' number call for the purpose of purchasing a product may be terminated and used to make the '800' call for the purpose of voting as will be explained in greater detail later.

In FIG. 3, the user device 30 includes a monitor 54 (of the kind commonly used with PCs) having a screen 31 showing display window 120 to a user.

Figure 4:
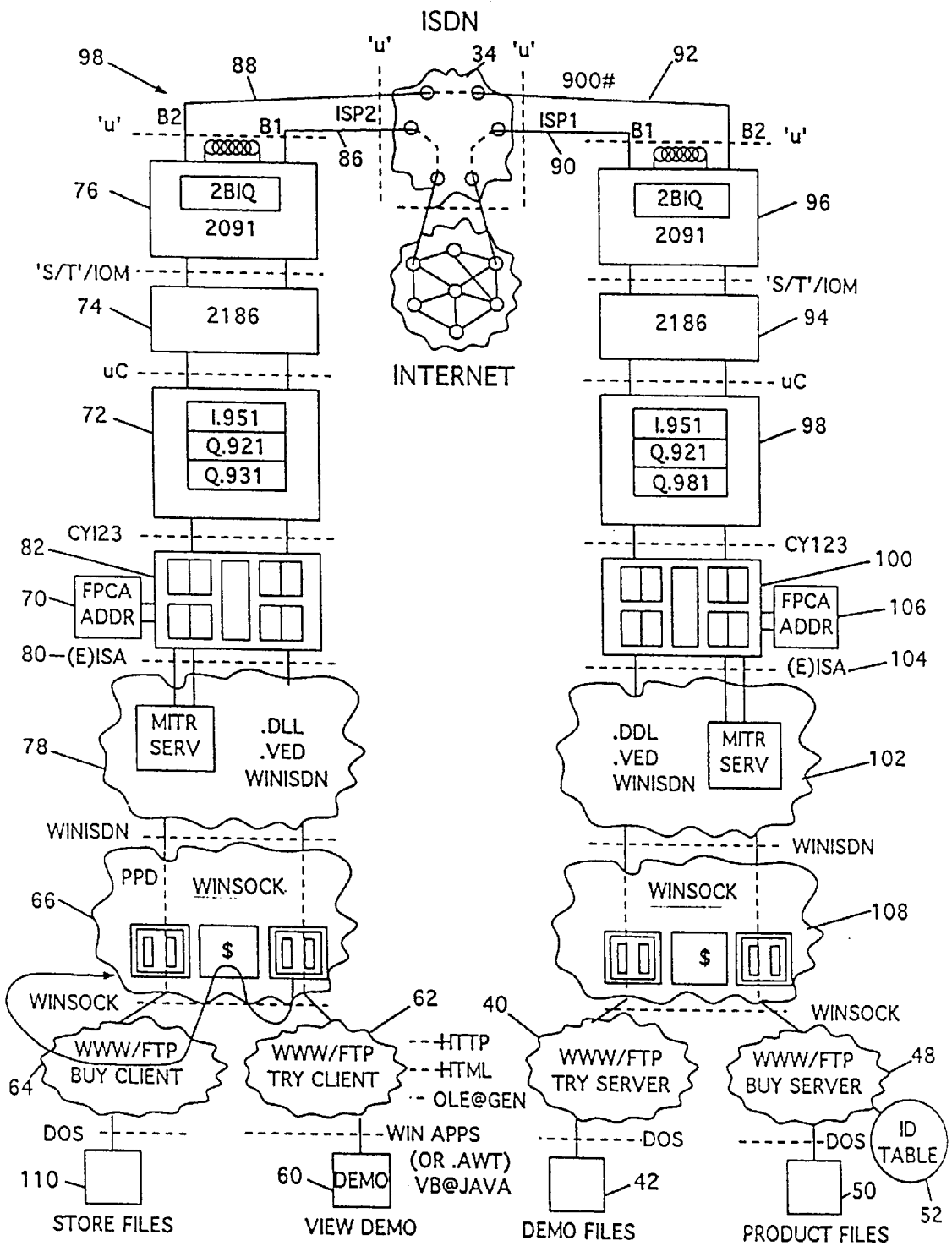
FIG. 4 shows a detailed diagram of the TRY and BUY financial transaction scheme employed in the preferred embodiment of the present invention.

FIG. 4 depicts a more detailed diagram of the system shown in FIG. 3. The left side of the figure illustrates the connection layers on the client side, and the right side illustrates the connection layers of the server(s). The buyer or client operates the client side while the seller or merchant maintains the server(s). On the client side (left side of FIG. 4) typically a user subsystem would be a personal computer (PC) such as an IBM compatible PC (not shown) including a monitor such as the client's display device 60 used for viewing demo products. The user's subsystem would further include web browsers 62 and 64 and TCP/IP protocol stack 66 which may be WinSock software and a plug-in card in the PC incorporating address decoder 68, dual port RAM 70, ISDN Protocol Controller 72, ISDN S/T interface device 74, and optionally Network Terminator 76. The card may be a CyberSpace Freedom Series ISDN terminal adaptor board for IBM PCs available from ISDN*tek Incorporated of San Gregorio, Calif. The user subsystem may include WinISDN drivers 78 available from ISDN*tek and WinSock software as TCP/IP protocol stack 66 from NetManage. Dual port RAM 70 addressed by address decoder 68 is accessed on one side by ISDN drivers 78 through the PC ISA or EISA bus (as the case may be) 80, and the other side by the Cybernetic Micro Systems CY123 ISDN Protocol Controller 82, which decodes driver commands and issues ISDN Q.931 messages on the D-channel by managing appropriate buffers in the Siemens 2186 ISDN S/T interface device 84. The S/T (4-wire) interface connects to the Network Terminator 76 of the (2-wire) local loop from the switch. This device 76, can be a standard unit or can be implemented as on ISDN*teks CyberSpace cards with Siemens 2091 ISDN Adaptive Echo Cancelling 2B1Q encoder/decoder. Client encoder/decoder 76 transmits data through the 'U' interface to either or both the TRY local telcom connection 86 (B1) or the BUY local telcom connection 88 (B2), connections 86 and 88 may be implemented as ISDN lines or POTS lines.

The local switching system 34 need not be an ISDN switch. TRY local connection 86 is a WEB connection through the Internet transmission media 36 which consists of many routers and switches and is a packet routing network structure as described earlier. Internet media 36 connects TRY local connection 86 to the TRY remote telcom connection 90. BUY local connection 88 on the other hand, is a direct switch telco connection through switching system 34 to BUY remote telcom connection 92. From the TRY and BUY remote telcom connections 90 and 92, the seller's interfaces resemble the client's interfaces, i.e., TRY and BUY remote connections 90 and 92 couple to the seller ISDN 'S/T' interface device 94 through seller Network Terminator (NT1) device 96 which encodes and decodes the 2B1Q signals across the 2-wire 'U' interface. The 4-wire ISDN interface device 94 couples to seller ISDN protocol controller 98 which accesses seller dual port RAM 100 on one side and seller ISDN drivers 102 on the other side. Addresses provided by the ISDN driver 102 cross the (E) ISA bus 104 and are decoded by the address decoder 106 before accessing the dual port RAM 100. Seller terminal adaptor board (incorporating 96, 94, 98, 100, and 106) may be a PC plug-in board communicating through (E) ISA bus 104 with the ISDN driver 102. The drivers 102 are connected to a BUY server 48 and a TRY server 40 by the WinSock TCP/IP protocol stack 108. The latter accesses the seller's WEB page and/or demonstration software files from demo file storage location 42 which may be in the form of hard disk, CD ROM, etc. The BUY server 48 accesses software product files that are available for sale to the client from a product file storage location 50. BUY server 48 additionally may access caller ID numbers from ID table 52. BUY server 48 and TRY server 40 are physically in areas that are remotely located with respect to the user. Additionally, BUY server 48 and TRY server 40 may be located remotely from each other. An example of this is where a seller may want to have TRY server 40 located in the marketing area of the organization and the BUY server 48 located in the purchase area of the organization and the marketing and purchasing facilities are physically located in two separate buildings or geographic areas. In fact, the only relationship between the TRY server 40 and BUY server 48 is the product that is for sale. Practically, TRY server 40 may be accessed many more times than BUY server 48 due to the number of users wanting to browse the seller's web page or wanting to try the demo software. Obviously, TRY server 40 and BUY server 48 may alternatively reside in the same physical location.

For a detailed discussion of the key subsystems and associated interfaces of the system as depicted in FIG. 4, the reader is directed to Applicant's U.S. Pat. No. 5,729,594.

While the preferred embodiment described above may be employed to implement the present invention, it is nevertheless possible to use other means to implement the present invention for evaluation of a purchased product. The scoring system embodied within the invention is intended to replace printed publications for offering criticism related to purchased goods. Yet, in the preferred embodiment unlike printed publications, there is no need for the user to subscribe to the publication in order to obtain rating or evaluation information on a particular merchandise because the relevant critical information is available to the user at the point of purchase as will be apparent shortly.

Additionally, there are several criteria for CyberScores (TM) most of which reduce to "truth in advertising". The "source of the score" should be authoritative, and the validity of the score should be unquestioned. The mechanism described herein is based on the belief that the best information comes from previous buyers, those who have purchased and used the product being scored. The validity is achieved by preventing multiple access to the scoring mechanism.

This mechanism does not preclude other sources of critical information from being included in the score as discussed in a following discussion on multi-dimensional scores, but it does achieve the desired goal of "primary score provided by purchaser."

Figure 5:
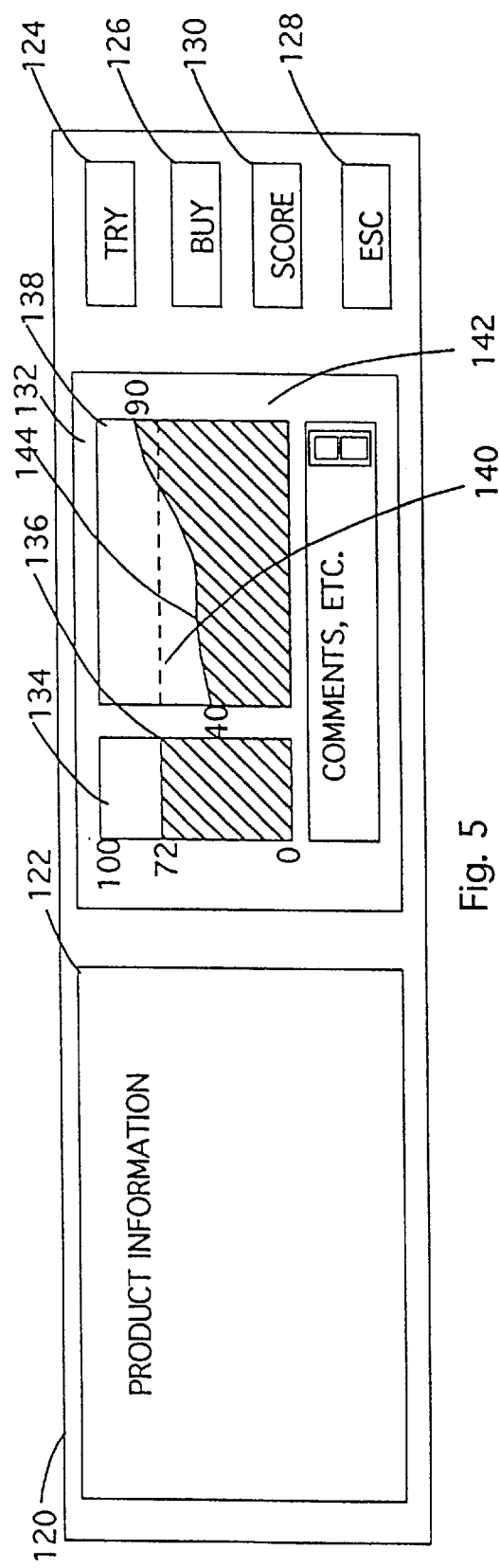
FIG. 5 shows an example of a computer screen having rating information relating to a purchased product as may be employed by the present invention.

As described in U.S. Pat. No. 5,729,594, a Application potential purchaser of a product through his/her web browser 62, may access the seller's TRY server 40 through the Internet media 36. The marketed product is preferably described in an HTML page that is available from the TRY server 40 on the World Wide Web (www). This page will have an embedded object type, or MIME, that can be handled by a web browser "plug-in". The plug-in will be invoked by the web browser when the embedded object is detected in the HTML page and a window will be opened on the customer's system (i.e. Internet terminal or monitor) as shown in FIG. 5.

Thereafter, the buyer may choose to download a demonstration version of the marketed product to his/her local system for the purpose of trying the demonstration software. If and when the user decides to purchase the product, his/her system or PC directly connects to BUY server 48 using either a second ISDN terminal such as BUY local connection 88 or a POTS line. This connection to BUY server 48 is made by the user's system using a toll telephone number such as a '900' number, obtained from the merchant's web site during access of the TRY server 40 by the user's system. This method ensures security for the buyer to safely perform electronic financial transactions of goods on the Internet yet, it alleviates overhead tasks associated with financial transactions for the merchant. The billing and payment associated with the goods may be handled by a third party such as the telephone company.

Furthermore, the purchased product may be hardware rather than a software product in which case the buyer merely completes an order form when purchasing the product through the direct telephone line connection.

In the preferred embodiment, during the purchasing of the product, the buyer's telephone number(otherwise referred to as caller ID) from which the direct '900' call was initiated will be stored in the ID table 52 by the BUY server 48 and will be used to increase security surrounding the rating of the purchased product as will be apparent at a later part of this discussion.

Scores in Cyberspace

Either prior to or after the purchase of a product, the buyer may wish to obtain evaluation or rating information with respect to the product in question. After the purchase of the product, the buyer may wish to rate the purchased product by assigning a score within a range of scores offered by the merchant, corresponding to the degree of satisfaction of the purchased product by the buyer. In performing either one of the above, the buyer's system may be provided with rating information which is ultimately displayed to the buyer, on the buyer's screen such as the one appearing in FIG. 5 (note, this screen may be also used when trying and/or purchasing the desired product).

In FIG. 5, the display window 120 contains therein another sub-window, the product information window 122, which may or may not include animation. TRY button 124, BUY button 126 and ESC button 128 operate in the same manner as described in the above-identified U.S. patent. TRY and BUY buttons 124 and 126 are utilized by the purchaser when trying a demonstration version of the product and when purchasing the product, respectively. TRY button 124 is also utilized for receiving rating information as will be discussed shortly.

"Clicking" on SCORE button 130, allows the buyer to rate the performance of the purchased product according to the buyer's satisfaction with the product. This "scoring" operation will be discussed after a discussion of how a potential buyer may receive rating information associated with a desired product.

During the purchasing of a desired product, the buyer's caller ID is recorded in ID table 52 (shown in FIGS. 3 and 4) after the buyer calls the '900' number where a direct connection is established between the buyer's system and the seller's BUY server 48 (shown in FIG. 3).

Assuming that after a period of use the buyer has come to an opinion on the quality of the purchased product (it may be a superior product, or it may be an inferior product), the buyer may wish to help other buyers and reward or punish the producer of the product by participating in the product evaluation system. If so, the buyer may then link again to the product's web page located on TRY server 40 (in FIG. 3) which was earlier accessed by the buyer when trying a demonstration version of the product. This connection link is established through the Internet transmission media 36 via either an ISDN connection or a POTS connection. The TRY server 40 has constant access to the product information and the most recent scoring display information. The nature of this access depends upon the physical implementation of the TRY and BUY servers. If both servers are implemented on a single processor, then the scoring information may simply be shared memory locations, in which the BUY server updates the raw score data, while the TRY server processes said raw data to provide a scoring display as described below. If TRY and BUY servers are co-located but in separate processors, then a Local Area Network (LAN) may be used by the TRY server to access the raw scores maintained by the BUY server processor. If TRY and BUY servers are remotely located with respect to each other, either a switched connection or a packet-based connection between the two can exist. The raw data is updated when any buyer chooses to "SCORE" a product as described below.

The new score data can be communicated to the TRY server at this time, over one of the previously described communication links, or the TRY server may access the latest score data at the time when a new client invokes the TRY server for information on the product in question.

The product information may be displayed in the user's product information window 122 (FIG. 5) on the user's screen 120 (FIG. 3) and the scoring information may be displayed in the scoring window 132 (FIG. 5) of screen 120 in various forms as will be discussed in greater detail later. Once on this web page, the buyer can click on the SCORE button 130. In alternative embodiments of the present invention, there are several actions possible at this point. The preferred embodiment method, a telephone number from a toll-free numbering systems such as the '800' telephone numbering system is presented from the seller's web page, located at TRY server 40, to the buyer. The buyer's browser on the user device 30, retrieves this '800' number for subsequent use if the buyer decides to provide rating information relating to the purchased product to the merchant.

Assuming the buyer wishes to provide rating information to the merchant, the user device 30 will call the retrieved '800' number through a direct modem or telephone connection. To do this, the user device 30 may first need to disconnect from TRY server 40 if the buyer only has one POTS connection. Otherwise, if the buyer is using ISDN connections (or if there is more than one POTS line available), user device 30 may remain connected to TRY server 40 on one channel while the other ISDN channel is used to establish the '800' connection.

The '800' call is provided free-of-charge to the buyer by the seller partly because any cost associated with scoring would tend to discourage all but the most impassioned scorers. The cost to the seller for use of the '800' number will simply be a cost of doing business in the interest of providing the best information for the customers of the system. It is also assumed that not all buyers will care enough to bother to score the product. Therefore the number of '800' calls paid for by the seller is expected to be significantly less than the number of '900' calls in which the system receives payment. It is also possible to use the web for scoring as described later, although this will tend to trade security of the scoring system for profit by the same. Not enough statistics are available today to accurately characterize the tradeoff between the '800' number and web page scoring.

As earlier indicated, when a 900 number purchase occurs, the buyer's caller ID is stored in the ID table 52 (FIGS. 3 and 4) which is maintained by BUY server 48. When a buyer wishes to "SCORE" the purchased product, as indicated by "clicking" on the SCORE button of the TRY display, an '800' number is retrieved from the TRY server, and this number is used to place a call to the BUY server 48 that maintains the ID table 52. A caller ID will accompany the incoming '800' number call to the BUY server. This incoming caller ID is used to search the table of stored buyers' caller ID numbers. If a match is found, the buyer is allowed to enter his/her score in accordance with his/her satisfaction with the product. The buyer's caller ID number is then deleted from ID table 52 by BUY server 48 thereby allowing each purchaser of the product one and only one opportunity to score the product. This should in turn prevent manipulation of scores and provide valuable information to the buying public from the most informed segment of the population, namely, those who have bought and used the product in question.

Note that if the '800' number is not used, forms can be provided in which the caller or buyer may provide his/her caller ID in addition to rating information and comments. An alternative scoring implementation could avoid the cost of the '800' number (paid for by the system, not the buyer) as follows. When the (earlier) buyer clicks on the SCORE button on the TRY page, the event can cause a scoring form to be presented on the screen. Such forms can be generated via CGI scripts, JAVA programs, JAVA script, Netscape Plug-ins, other means commonly used to provide forms to Internet users of web browsers. The buyer will be asked to fill in the scoring section of the form, and, in addition will be asked to input the telephone number of the phone used previously to call the 900 BUY server. When the form is completed, and the user clicks OK, DONE, or equivalent, the TRY system communicates with the BUY server, using one of the previously described communication links, and the score and user specified caller ID are sent to the scoring subsystem of the BUY server, where the Caller ID is used to search the ID table 52. A successful search causes the score to be updated, while an unsuccessful search terminates the process or asks for a retry.

In this implementation, the Caller ID is provided by the user via a form-based packet mechanism instead of by the telco system as is the case when an '800' number is called. In theory, this allows a false Caller ID access to the score (although only once, since the matching-Caller ID will then be removed from ID table 52). This trade-off of Caller ID security versus cost of '800' number calls must be considered when choosing an implementation.

Displaying Rating Information

In FIG. 5, score window 132 may include a shaded bar area 134 appearing at the left of the score window 132. Shaded bar area 134 provides a numerical score such as '72' which is labelled at the top of the shaded bar 136, from a range of scores starting with '0' to '100'.

To the right of the shaded bar area 134, appears an x-y graph 138 with its vertical axis 140 representing score values and its horizontal axis 142 representing the number of responding scorers, to date. The shape of the score curve 144 indicates the distribution of scores over all respondents with the lowest score appearing at the left side of the x-y graph 138 and the highest score appearing at the right side of the same (in FIG. 5, the lowest and highest scores are indicated as 40 and 90, respectively) and intermediate scores sorted in increasing order. The area under curve 144 may be shaded or color-filled. The graphical representations appearing in score window 132, allow the potential buyer to observe the general acceptance of the product being reviewed prior to making a purchase.

In typical applications, the existing score associated with the product will be displayed in either the product window or a sub-window. If displayed in the product window, the score may initially appear off of the screen and not within the user's site where the user may have to scroll through the window in order to access the score. If in a sub-window, the sub-window may be continuously displayed, or else the user may have to select still another button in order to display the score. In short, the score may be viewed by scrolling through the main product information window, or viewed in an already visible sub- or secondary window, or called into view by selecting another button (not shown in FIG. 5).

Figure 6:
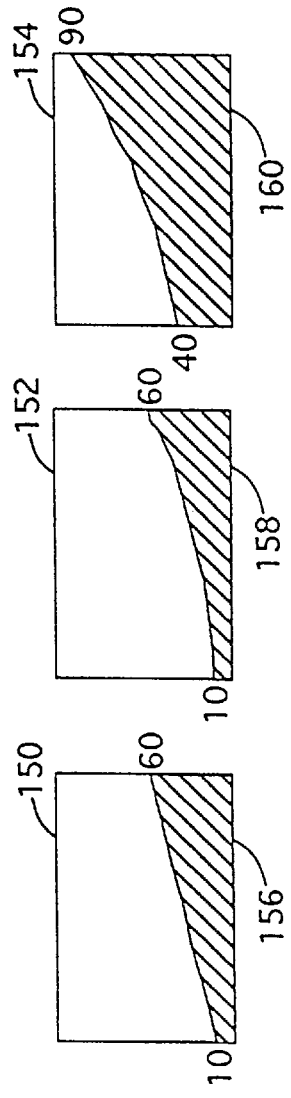
FIG. 6 shows an example of a display showing evaluation results presented in various forms relating to the degree of consumer's satisfaction with a product.

In FIG. 6, three examples of graphs or score displays representing distribution of scores over all responding scorers are provided. The vertical axes of these graphs each represent score values and the horizontal axes 156, 158 and 160 of the same represent the number of responding scorers.

Graph 150 shows a typical range of scores starting from the value 10 to 60. The information conveyed by graph 152 indicates that most of the respondents assigned a very low score, i.e. in the 10's, to the evaluated product while some respondents thought fairly highly of the product as shown by scores ranging in the 20–60's. Graph 154 shows the lowest score to be 40 while most respondents rated the product closer to 90.

The horizontal axes of the graphs in FIG. 6, namely 156, 158 and 160 provide valuable information relative to the number of responding scorers. A score derived from the response of ten thousand respondents is clearly more significant than a score derived from three respondents. Horizontal axes 156, 158 and 160 (not labelled in FIG. 6) indicate how many users evaluated the product thereby providing valuable data regarding the number of previous users of the product to a potential buyer.

In an alternative embodiment (not shown), the evaluation of a product may be based on a digital YES/NO decision scheme as apposed to a weighted or analog value scheme. The latter being the scheme described above and presented in FIG. 6 wherein a range of values, e.g. 1–100, may be used to rate or evaluate a product. That is, rather than a range of values associated with the rating information, the user of a product (or a voter voting in a poll or election which is alternative application of the preferred embodiment, explained in greater detail later) may provide a 'YES' input if satisfied with the product or a 'NO' input representing dissatisfaction with the product.

Score graphs such as those shown in FIG. 6, additionally furnish information that may be useful for a variety of reasons. For example, graph 152 in FIG. 6, shows that most respondents scored the product being evaluated quite low, but a segment of the respondents gave the product a fair score. This graph may for example, represent an evaluation for a work of fiction based on Shakespeare's plays. The lower scores may be attributed to the respondents being mostly from a group of people to whom the work of Shakespeare was of little interest, however the higher scores may be attributed to Shakespeare lovers or scholars to whom the work was deemed interesting. This example shows the desirability of a more multi-dimensional scoring mechanism. That is, respondents may be sub-classed into categories for purposes of evaluation wherein a product might be given a general score from which an integrated score is computed. Additionally, one or more special categories comprising of special interest groups may be used to evaluate the product in order to more meaningful statistical information to users with different interest for the same product.

At least two major approaches to handling special interest groups are possible with this invention. The first approach involves using defined categories and performing mathematical analyses on the scoring data with respect to these categories. A second approach involves linking to specialty sites in which the product may be reviewed in a special light where the reviewers' recommendations are written with emphasis on the special concerns of the group. In the second approach, either the special interest groups can be named by the seller when the product is placed on the market or with suitable design, the special interest groups can request that links to their site be added at some future time.

It will be evident to one skilled in statistics that many classifications and categories can be defined that will provide meaning far beyond the simple numerical score derived from the integrated value score. The complex statistical treatments are easily accomplished in today's computers and should be available to those consumers who can make use of such information.

A further feature of the present invention is the 'malleable' nature of the scoring display. Because it is so easy to download new code from an Internet web site, the actual scoring algorithm should not be considered fixed. Raw data should be preserved over time, but the actual score display algorithms may be updated as often as appropriate. Of course, the meaning of the single integrated score should be preserved, but other, more complex derivatives of the data can evolve to keep up with changes in product mix and/or sophistication of the buying public.

While graphs or score displays such as those shown in FIGS. 5 and 6 may be employed in the preferred embodiment to represent distribution of scores over all responding scorers, other forms of representations of rating information may be utilized. For example, the simplest score is a value selected from a range, such 1 to 10 or 1 to 100. Such a score has the benefit of being understandable by most people, however, it also carries a minimum amount of information. For this reason, all score displays should include a simple numerical score and a range, but more sophisticated score displays such as those shown in FIGS. 5 and 6 will be more useful to a broad range of potential buyers.

Practically speaking, the score display graph and the single score value as described above, are related by way of the single value being derived from the graph and representing an integrative function of total scores, such as an average or mean value over total scores.

While for obvious reasons, the graph is more complex than a simple single score value, it is nevertheless the more desirable form of representation of rating information because of its ability to provide more information to the user. The complexity associated with the score display manifests itself when used in the Internet transmission media due to the latency associated with providing such information in this form of packet switching media. This can be addressed in two ways. First, as the Internet becomes ubiquitous and more commerce occurs over the net, sophisticated information should be available to those who desire the same. Second, it is always possible to simplify the presentation of information. For example, some print newspapers use an icon in the movie review section in which the stylized view ranges from absent (having walked out) to sleeping, to upright and alert to standing on the chair applauding. "Complex" graphic scores can readily be mapped into simple "cartoon" icons to provide such simplistic displays. An algorithm to accomplish this mapping may use the "area under the curve" of the graph, normalized by the maximum possible area under the curve such that the normalized maximum possible area corresponds to a value of one. For 'N' icons the normalized score is multiplied by N. The result will identify the corresponding icon to be shown in place of the graph.

Figure 7:
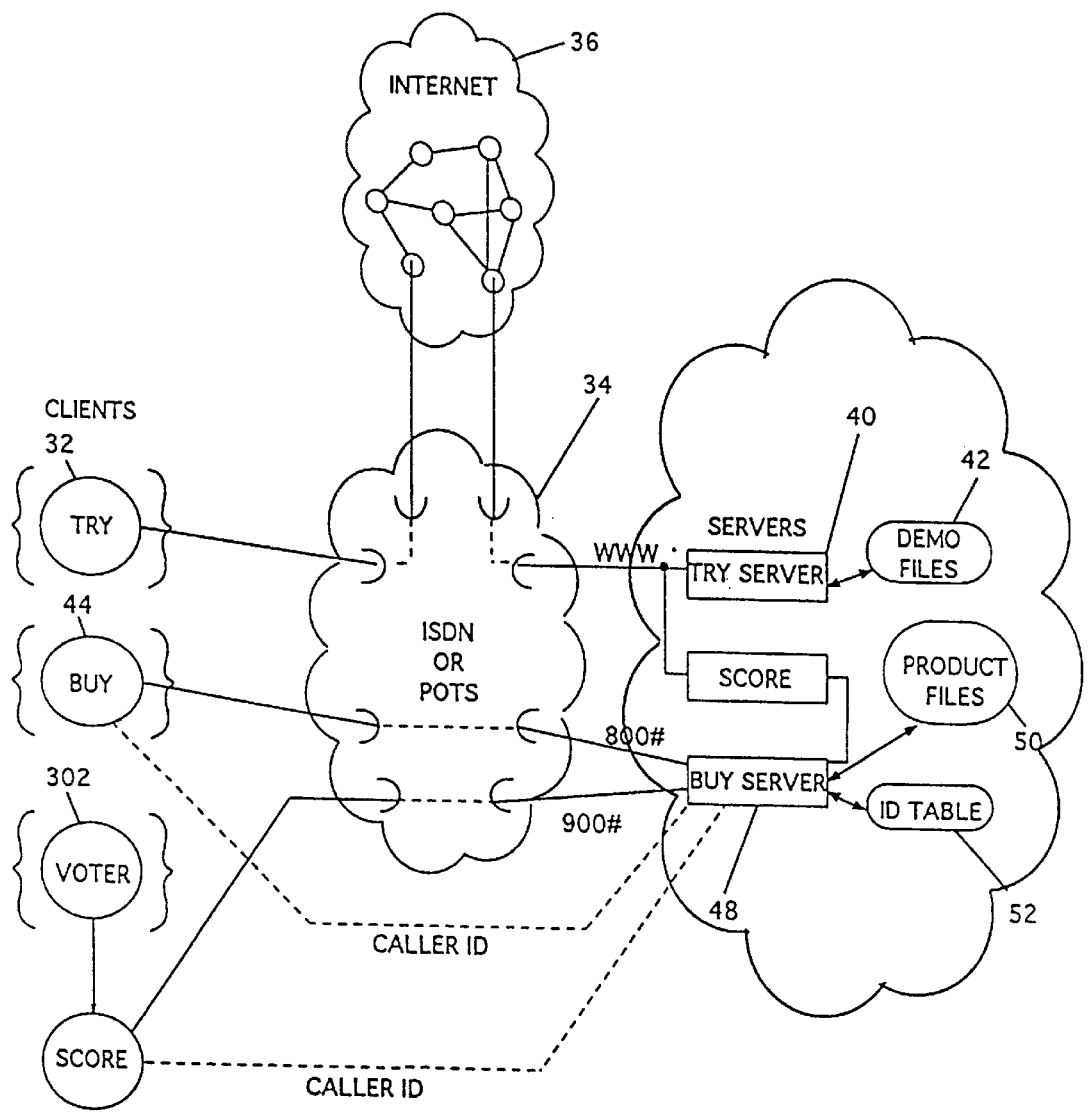
FIG. 7 depicts a state diagram of an implementation of a preferred embodiment of the present invention.

FIG. 7 shows in simple form, a preferred embodiment implementation of the present invention. In FIG. 7, the seller's software product is assumed available on an owned or leased Internet web server(s), such as the TRY server 40 and the BUY server 48. The merchant may employ one physical server for accessing his/her demonstration software or web page and another server for accessing the software product for sale (assuming the merchant wishes to sell electronic or digital data products). The two servers do not have to be two physically separate servers if software on one machine can manage two separate servers tied to separate telco connections which is possible by utilizing WinISDN. However, even if two physically distinct servers are utilized, each of these servers can be very low cost systems due to no need for authentication procedures and the like.

Referring now to FIG. 7, the seller makes available any desired product information, possibly including downloadable demonstration software (assumed to have either limited functionality, lifetime, or other limiting factors) on TRY server 40. The seller then either obtains a '900' number or contracts with a '900' number server on which the product is stored. The merchant may now conduct business transactions over the Internet.

In FIG. 7, initially, the potential customer places a call through TRY local telcom connection 32 to his Internet service provider's local router and connects via PPP, to the router and ultimately connects via his/her web browser to the web site presented by TRY server 40 containing the seller's demo software product or information as well as a product scoring display. This connection is made through the Internet media 36 using either an ISDN channel or a POTS line connection.

Upon accessing the seller's web page, the potential customer is presented with a window on his/her screen similar to that of window 120 in FIG. 5. The potential customer studies the product information and possibly downloads the demo software which is accessed from demo file storage location 42 by TRY server 40. Besides the product information, the potential customer may study the evaluation rating associated with the product which is also provided by TRY server 40.

Upon deciding to purchase the product, the customer retrieves the '900' toll telephone number specified in the seller's product information, disconnects from the Internet media 36 if only one POTS line is available (otherwise, if the customer's system uses ISDN or more than one POTS line, the customer may remain connected and access another line) and calls the '900' number from his/her modem. The customer's software then negotiates a common protocol via PPP and connect to the seller's product BUY server 48. If information is for sale, the buyer can download the information immediately. If hard goods are for sale, the buyer can complete an order form(s) for shipping and billing purposes. Note that the buyer can provide credit card information to pay for purchases of hard goods and the merchant can obtain approval of the buyers' credit prior to shipment of the product. As discussed earlier, the buyer is directly connected via telephone line when purchasing the desired product so that his/her credit card number does NOT transfer through the Internet. Obviously, encryption techniques can be utilized here, if desired. In place of digital signatures using a trusted third party, the seller may insist that the buyer's caller ID not be suppressed. In any case, the '900' call can be billed to the buyer and telco will pay the merchant for the sale of the product after deducting any associated telco maintenance fees.

If the buyer's caller ID number has not been suppressed, BUY server 48 will record the buyer's caller ID number in ID table 52 along with any other aspects of the sale that may be required for an audit trail. The caller ID number can be stored in a manner that can be found and tested against incoming scorer calls. If the incoming call to the '800' number matches any caller ID from any previous buyer, then the incoming caller is granted scoring access. The actual form used to score the product can vary, and can be updated over time as more useful scoring formats are evolved. The mechanism utilized for obtaining security does not depend upon the format in which the scorer enters his critique.

Score Security

The "security" associated with the performance rating method and apparatus of the preferred embodiment is an important aspect of the same. The security offered in the purchasing of a desired product as taught in the above-referenced U.S. patent wherein the buyer directly connects through a '900' number with the merchant's BUY server serves as partial basis for the security of the present invention. Starting from June 1996, nationwide caller ID regulations have gone into effect, mandating telco and carriers to deliver caller ID to users unless the user or calling party specifically declines this service in which case the caller ID feature is blocked. The decision to decline caller ID may be made on a call-by-call basis. The teachings of the present invention utilizes the caller ID feature associated with calls placed through the switched network (telephone connections) to increase security.

As disclosed in detail above, the preferred embodiment uses the caller ID number to identify buyers in order to prevent inaccurate evaluations of a given product such as avoiding situations where buyers provide more than one score per product and further where non-buyers have an opportunity to provide a score for a product they never purchased.

As a matter of principle, caller ID information may be held in confidence by the merchant since some people tend to regard their telephone numbers as sensitive information, although one may argue that those who do regard their telephone numbers as sensitive information would probably opt to block or suppress caller ID. For those buyers who opt for the latter, there is absolutely no effect on actual purchasing of a product. However, the buyer may give up the right to rate or provide a "score" associated with the product.

In the event that the buyer does not inhibit the caller ID information, the merchant's BUY server 48 (FIG. 3) can associate the record of the purchase with the buyer's caller ID which is stored in ID table 52. In this manner, only actual buyers and/or users of the product who are most qualified to score the product, evaluate the product and it is this information that potential buyers most wish to see. In fact, there is little or no reason to provide any other party with an opportunity to evaluate the product. Thus, the caller ID, combined with the '900' number purchasing system as taught in the above-referenced U.S. patent provide the optimal scoring security mechanism for electronic financial transacting.

System Implementation

The following presents a discussion on an implementation of the preferred embodiment, some portions of which are similar to the discussions the above-referenced in U.S. patent. Therefore, the reader is directed to the latter for a better understanding of the overall financial transaction architecture.

Because the extraordinary growth of the Internet is based on the World Wide Web, the preferred implementation will work with HTML. There are two cases, either of which create a new web browser or modify an available browser. The HTML basis of web pages is simple, as shown below:

```
<HTML>
<HEAD>
    <TITLE> The Product name or other title
</HEAD>
<BODY>
<H1> This is a heading
<P> This is a new paragraph
</BODY>
</HTML>
```

A web browser, after connecting to the web site via TCP/IP, downloads the web page and interprets the text. The browser formats the displayed text on the user's screen according to the markup language elements. We can define three new elements and insert them into the HTML text strings.

```
<#900 Dial="1-900-555-1234">
<$Cost Cost="$7.95">
<%Score Score="72/100">
```

It is a simple matter for one skilled in the art to parse the expressions to retrieve the cost, the 900 directory number, and the score, and to then call appropriate software subroutines. Note that the Score parameter value will be updated over time as new scores are recorded.

Although it is possible to develop a custom web browser, it is much easier to achieve market penetration by extending popular software than by introducing entirely new software to the market. At the time of this filing, the Netscape Navigator is the most widely used web browser. Therefore, in this discussion, the basic functionality of Netscape Navigator will be shown to extend to handling the requirements of the present invention.

As an example, assume that the seller wishes to display control buttons, a score display and a description of the product that is being offered for sale to Internet users in an effort to market his/her product to potential buyers over the Internet:

Referring now to FIG. 5, the product description appearing in the product information widow 122 and the four TRY, BUY, SCORE and ESC buttons, 124, 126, 130 and 128, respectively, are shown when for example, a potential buyer accesses the seller's web page. If animation is to be included, the animated action need be maintained (the product description may be an animated cartoon, a film clip, an audio clip, etc.) The product score display window 132 as shown, is as described earlier. When the user selects one of the four buttons, via key or mouse click, etc., an appropriate action is initiated by the merchant's system.

The Netscape Navigator can be modified to support such displays via a mechanism known as a "plug-in". The tools and documentation necessary to develop such "plug-ins" can be found on the web at site address:

http://home.netscape.com/oemprod/development_partners/plugin_api/index.html

Plug-ins allow the developer to create a window within the Navigator environment, and use the window to display information, execute an application, support application-to-application communications, or provide links to other web sites. Plug-ins are invoked when an HTML page is downloaded that includes the specific data object for which the plug-in is written to handle. Plug-ins are embedded in HTML via the EMBED tag. A plug-in is a dynamic code module. Unlike JAVA modules, which are platform independent, plug-ins are platform dependent.

A fundamental use of a (Netscape) plug-in is to fetch a URL with the same functionality as the Netscape client software. The plug-in can use the Netscape API functions, and can also use the Windows API, Winsock API, WinISDN API, Video for Windows, etc. The code for the plug-in is developed using Visual C++ and a DLL is created that will be loaded at the appropriate time. The plug-in is embedded in the HTML page using the EMBED tag:

<EMBED src width height>

The "src" parameter links the browser to the plug-in code, while the width and height parameters specify the size of the plug-in window. The plug-in API provides a native window handler to the plug-in.

Further details including example software programs on plug-ins are provided in the Netscape Navigator Plug-in Software Development Kit. Given a native window handler, it is apparent to one skilled in the art that text fields, buttons, lists, and other window elements can be implemented in the window and that the window handler is sufficient for event processing.

Standard window event processing allows the plug-in to respond to mouse clicks in the plug-in window. Assume the user clicks on the ESC button 128 in FIG. 5. This button should close the window, cancel the operations, and return to the Netscape Navigator.

Assume the user clicks on the TRY button 124. The action to be taken will depend upon the form of the product information or demo. In the simplest case, a URL allows the Netscape Navigator to retrieve and display the product information. Alternatively, a JAVA applet may be downloaded and executed, or an application-to-application procedure may be executed by the plug-in "TRY" process. Thus the possible responses to selections of the TRY button 124 may range from displaying product information to sophisticated interaction with the user.

Assume the user clicks on the BUY button 126. The action should either result in the downloading of the purchased information, or in the presentation of an order form for hard goods that require shipping. The preparation of an order form via CGI, JAVA script, plug-in code, etc., is apparent to one skilled in the art, therefore we focus on the common procedure, that is, communication with the 900-number server.

When the user clicks on BUY button 126, the plug-in event handler must retrieve the 900# and the cost parameter from the HTML page. These parameters may be simple HTML text that are read and recognized by the plug-in procedure. An alternative method may take advantage of the optional attributes associated with the EMBED tag. The plug-in developer can devise attributes that will be processed by the plug-in, as appropriate. For example, a plug-in might use the following:

<EMBED SRC="product.buy" WIDTH=320 HEIGHT= 200

DIAL="1-900-555-1234"

COST="$9.95"

SCORE="72/100"

VOTE="1-800-555-6789">

When the "product.buy" MIME type is encountered, the (previously registered) plug-in is invoked and the 320×200 pixel window 120 is created with appropriate buttons. The plug-in can read the invented SCORE, DIAL and COST and VOTE parameters and use these as appropriate.

In the present case, clicking on BUY button 126 will cause the plug-in to retrieve the cost parameter and the '900' number and initiate a call to the BUY server 48(not shown in FIG. 5), from which the product is to be downloaded. The plug-in will be notified when CONNECTION has been successfully established. The plug-in will then call the PPP negotiation procedure, optionally passing the cost parameter (and other parameters) for the PAP negotiation. Upon successful completion of the PPP negotiations, the plug-in can perform UDP or TCP downloading of the purchased product to the user device 30 in FIG. 3. Upon completion of downloading, the plug-in can terminate or optionally launch the new product.

When the user clicks on the SCORE button 130 in FIG. 5, the plug-in event handler should present the user with a "dialog box" which asks the user to input the value of the score to be assigned, along with any comments the user may wish to record. Then the plug-in must retrieve from the HTML page the '800' number associated with the EMBED tag and initiate a call to the BUY server, from which we assume the product has been previously purchased.

The plug-in will be notified when the CONNECTION event is successful. The plug-in will then call the PPP negotiation procedure, and pass the score parameter (and other parameters) via the PAP negotiation. Upon successful completion of the PPP negotiations, the scoring sub-system of the BUY server(not shown) will have captured the caller ID number associated with the incoming '800' call and will have performed a search of a look-up table in ID table 52 (FIG. 3) to see if the incoming caller ID matches any of the caller IDs that have been stored at previous purchase times. If the search fails, the user may be asked to try again, or the process may simply terminate. If the search found a caller ID match, then the score which was passed in the PAP negotiation will be recorded, and the caller ID will be removed from the list of purchaser caller IDs. This effectively prevents multiple voting or scoring by a single purchaser. The call is terminated and the scoring action is complete from the perspective of the user. These steps are once again discussed later in reference to FIGS. 8(a) and 8(a) which show a flow chart of the processes involved in the preferred embodiment evaluation system.

The remaining behavior depends upon whether the TRY and BUY servers are implemented in the same machine, or in different machines, and upon the connectivity between them, if different machines. In the case in which both servers are implemented on the same machine, the system software must retrieve the new score and update the raw data base of scores from which the scoring display is generated. If different machines are used, there must be communications between the BUY server which maintains the list of caller IDs and the raw scores database and the TRY server which maintains the product description or demo and creates the scoring display from the raw scores. This communication can most inexpensively be performed over the Internet, however this can represent a "score security" weak point. Encryption may be used to improve security, or X.25 packets on ISDN D-channels may be used to achieve more secure communications at a very low cost. In summary, the most efficient, most secure, and least expensive communications between TRY and BUY servers occur when both servers are implemented on the same machine, or at least on the same Local Area Network (LAN).

The following TRY-BUY-SCORE process uses open standards (Winsock, WinISDN, PPP, TCP/IP, Q.931, Plug-in API, HTML) and commercially available software (Netscape Navigator, Netmanage Winsock, ISDN*tek WinISDN) and hardware (IBM PC clone and ISDN*tek PC*TE terminal adapter.) The plug-in can be built with the commercial Visual C++ tools from Microsoft. Many enhancements and variations on the above theme will be immediately apparent to one skilled in the art.

Assume TRY and BUY servers exist in "listen" mode, Netscape with the appropriate plug-in exists on the client (buyer's) machine, and that the client is already connected to the Internet on ISDN channel B1. The process flow is as follows:

(IF) URL=Product site (or product directory catalog site)
1. Send TCP/IP packets from Winsock
2. Send TCP/IP packets through WinISDN
3. Send TCP/IP packets over ISDN B1-channel
4. Router interprets TCP/IP address from URL) and routes to
5. "TRY" server, which fetches appropriate HTML file and
6. sends HTML file back (up the chain) to Netscape Navigator.
7. The Netscape browser encounters EMBED tag in HTML
8. and creates plug-in window and links to plug-in DLL
9. The TRY server accesses SCORE data from the BUY server.
10. The plug-in DLL responds to mouse click or "BUY" button
11. by retrieving the 900# (rom EMBED parameter or other)
12. and calling WinISDN CONNECT( ) function to set up a
13. data call on channel B2 to the BUY server at the 900#.
14. The BUY server temporarily stores the incoming caller ID.
15. The BUY server then negotiates PPP with the plug-in routine
16. that calls the Winsock PPP routine (+optional PAP parameters).
17. Upon completion of PPP, Winsock can be used to send TCP/IP
18. packets which fetch the product info being purchased.
19. The BUY server then adds the buyers caller ID to its list of IDs.
20. The downloaded product is saved and/or executed.
21. The buyer uses the product and desires to SCORE the product.
22. The buyer reconnects to the Internet and then to the TRY server.
23. The TRY server encounters the EMBED in the HTML page and
24. opens the plug-in window and displays product info and scoring.
25. The user clicks on SCORE and the plug-in retrieves the 800#.
26. The plug-in dials the 800# and connects to the BUY server.
27. The BUY server compares the caller ID to its stored list of IDs.
28. If a caller ID match occurs, the BUY server negotiates PPP and
29. the PAP protocol is used to pass the user score (and other)
30. The new score is added to the raw score database and
31. the caller ID is deleted from the list of IDs. and
32. the 800# call terminates.
33. the next TRY will use the updated scoring database.

The preferred embodiment scoring system as discussed above, is presented in flow chart form in FIGS. 8(a) and 8(b). In step 160, as shown in FIG. 8(a), the seller installs demonstration software and any product and/or scoring information (scoring information may not be available at the outset since the product was probably not previous to this time, offered for sale) relating to his/her product on a server (referred to as TRY server 40 in the above discussion) and provides a web address to users of the Internet to enable them to access his/her web page.

Figure 8A:
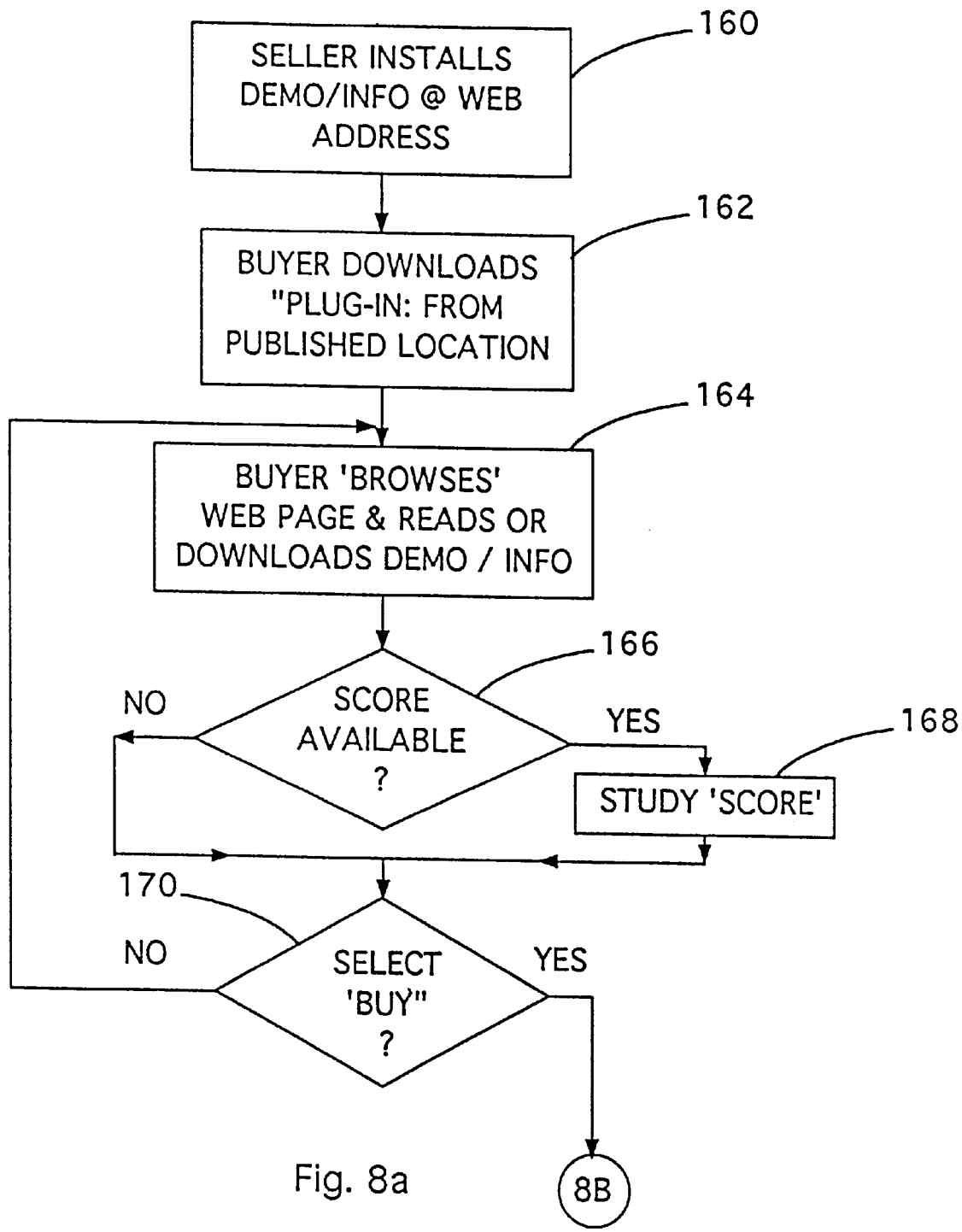
FIGS. 8(a) and 8(b) collectively provide a flow chart of the preferred embodiment steps employed in an implementation of the present invention.

In step 162 of FIG. 8(a), a potential buyer downloads "plug-in" from the published seller's web page location. The Netscape "plug-in" may be either distributed by Netscape, or may be downloaded from a specified web location that is published by the seller of the system.

Figure 8B:
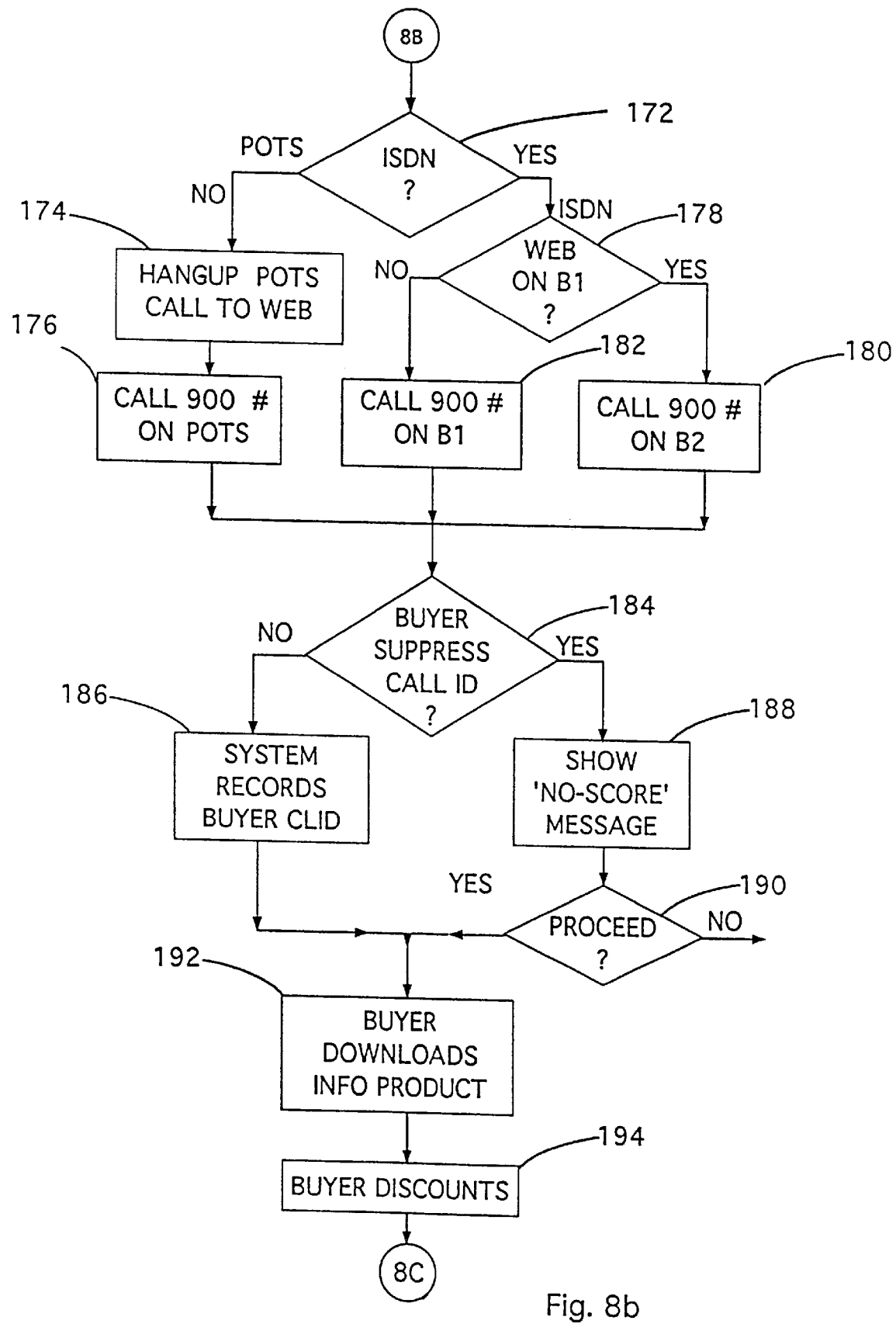
Figure 8C:
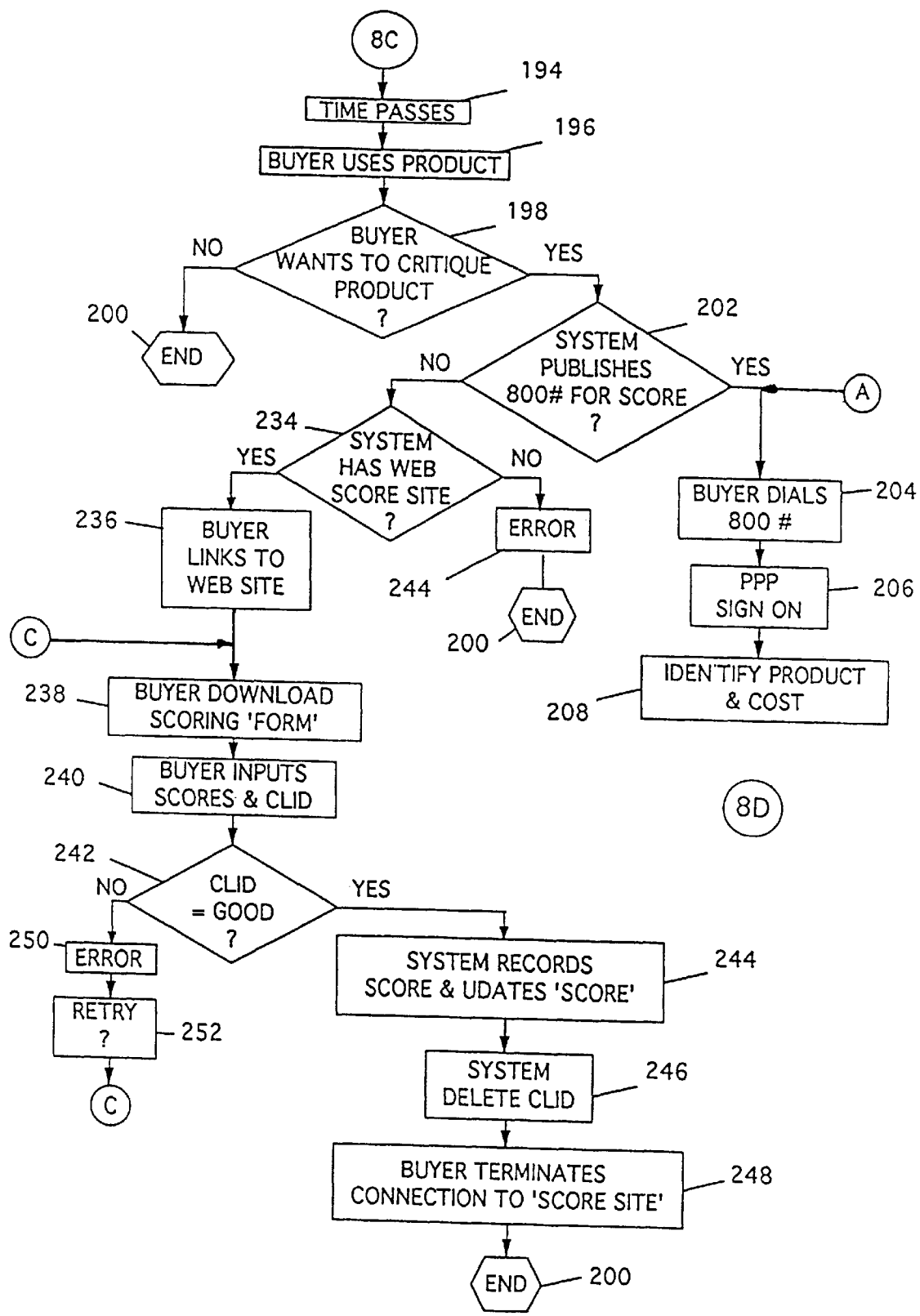
Figure 8D:
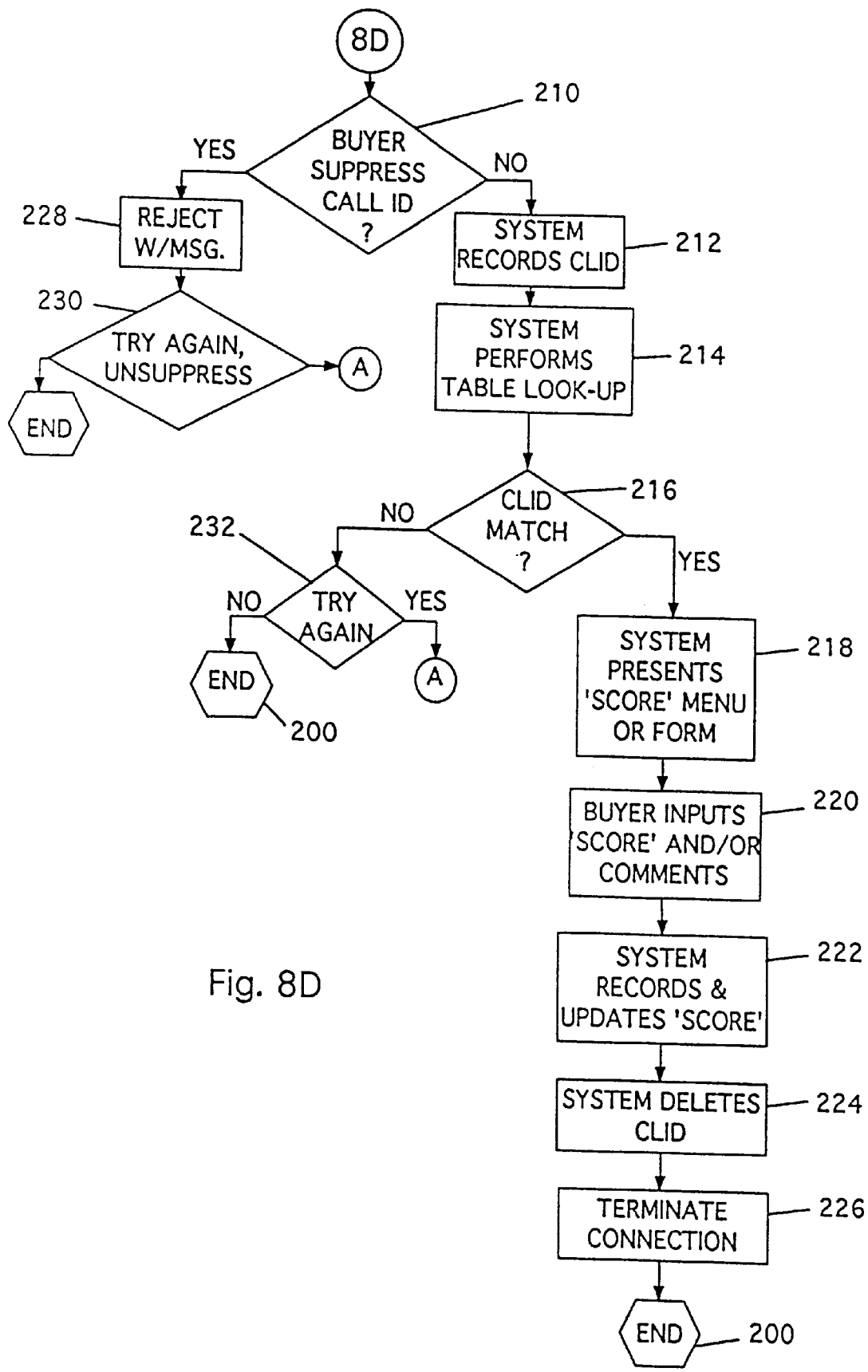

In step 164, the potential buyer then browses the seller's web page through the Internet transmission media, and reads or downloads the seller's demonstration software. As indicated by decision block 166, if there is any scoring information provided by the seller on his/her web page, in step 168, the potential buyer may choose to study the scoring information. Otherwise, and/or after the potential buyer has completed studying the demonstration software and any scoring information related thereto, at step 170, he/she may select to BUY the product. In the event the potential buyer decides not to purchase the product, he/she may wish to return to step 164 to further browse the seller's web page.

Where the potential buyer (referred to as buyer from hereon relative to the discussion of FIGS. 8(a) and 8(b)) chooses to purchase the product, the buyer's system if automated, must determine whether the buyer is using an ISDN terminal connection or a POTS line as indicated by decision block 172. In the case of the latter where there is only one POTS line available, in step 174, the POTS line connected to the Internet must be terminated and a '900' telephone call is made on the same POTS line in step 176 (the '900' telephone number used by the buyer's system to make this call, is retrieved from the seller's web page). On the other hand, if the buyer's system does use ISDN, the buyer's system must determine which channel is in use and connected to the Internet as indicated by decision block 178. In step 180, if the Internet connection is on the B1 channel, the '900' call will be made on B2 and if the B2 ISDN channel is in use, the '900' call will be made on the B1 ISDN channel as indicated in step 182. It should be noted that if the buyer's system is not automated, the buyer may manually perform steps 172–182.

At decision block 184, if the buyer has not suppressed his/her caller ID or chosen caller ID blocking, the seller's system stores the buyer's caller ID in the seller's BUY server(not shown) as indicated by step 186 and the buyer in step 190 downloads the product if it is in the form of software or digital information. Alternatively, if the product is a hardware good, the buyer completes an order form by providing shipping and billing information to the seller.

If the buyer has suppressed caller ID in step 188, a message indicating that the buyer will be prevented from rating the product is provided by the seller's system on the buyer's display screen. The buyer may then decide not to proceed as indicated in decision block 190. In fact, the buyer may be provided with options to either exit, proceed with purchasing the product while not being able to provide rating information or retry after unsuppressing his/her caller ID. If the buyer decides to proceed, step 190 is performed in the same way as previously described.

After the buyer purchases the product, the '900' call is disconnected in step 192.

In FIG. 8(b), after some variable amount of time, in step 194, the buyer may use the product as indicated by step 196. At decision block 198, the buyer may have the option of critiqueing the product if he/she has not suppressed caller ID as discussed earlier. If the buyer does not wish to provide rating information to the seller, there is no further action as indicated by "END" step 200.

The more interesting scenario occurs when the buyer chooses to provide scoring information to the seller in which case if the seller has published a toll-free number such as an '800' number, indicated by decision block 202, the buyer(if software automation is not used) or the buyer's system (if software automation is used), dials the '800' number in step 204. PPP is used to negotiate with the seller's BUY server (not shown) in step 206, the product is identified and cost information is transmitted from the buyer's system to the seller's system in step 208. In decision block 210, if the buyer has not suppressed his/her caller ID, the seller's system will record the buyer's in-coming caller ID in the seller's BUY server at step 212.

At step 214, the seller's system searches its table of recorded caller ID numbers for the in-coming caller ID number and if there is a match, 216, the seller's system presents to the buyer through the '800' call connection, a score menu or score form in step 218 for evaluation of the purchased product.

In step 220, the buyer provides rating information corresponding to the degree of the buyer's satisfaction with the purchased product and perhaps some comments relating to the product and transmits the same to the seller's system. In step 222, the seller's system records the rating information provided by the buyer and subsequently updates his/her latest scoring information in order to maintain the most recent scoring information for the purpose of presenting the same to the next buyer. The seller's system then deletes the buyer's caller ID number from its look-up table of caller ID numbers in step 224, so as to prevent the possibility of multiple scores per buyer. In step 226, the '800' call is terminated.

If the in-coming caller ID number does not match one of the stored caller ID numbers contained in the seller's system, the buyer is free to try again or to end the process at decision block 232. If the buyer chooses to try again, the same steps as outlined above are taken, starting with step 204.

In decision block 210, if the buyer has suppressed his/her caller ID features, the seller's system will not allow the buyer to rate the product and may provide a message to the buyer's screen to this effect as indicated in step 228. Here again, the seller may provide options to the buyer to either exit and end the system or to try again after unsuppressing caller ID as shown by decision block 230. If the latter option is chosen by the buyer, after unsuppressing caller ID, steps starting from step 204 are processed, as discussed above.

If the seller's web site does not publish a telephone number for rating the product (decision block 202), and the seller's system offers no other web site for scoring at decision block 234, the system will report an error, as indicated by block 244 and the process ends.

On the other hand, in the event the system has a web score site, the buyer links to that score web site in step 236 and downloads a scoring form provided by the seller on the web score site in step 238. The buyer then inputs his/her evaluation relating to the purchased products in step 240 and the buyer's caller ID number is transferred to the seller's system. In step 242, the buyer's caller ID number is verified against a list of caller ID numbers stored in the seller's system and if there is a match, the seller's system records the buyer's inputted scoring information in step 244 and the scoring information is updated to reflect the buyer's input for the purpose of providing the most recent scoring information to the next purchaser of the product.

At step 246, the seller's system deletes the buyer's caller ID number and at step 248, the buyer terminates the connection to the seller's score site and the process ends.

In the event the seller's system is unsuccessful in verifying the buyer's caller ID number in decision block 242, an error is detected in step 250, and the buyer may be given an option to retry the process in step 252 where the process flow goes back to starting from step 238.

Alternative embodiments of the above steps such as combining certain steps, will be apparent to those of ordinary skill in the art without departing from the spirit of the invention. For example, at the time the buyer is initially browsing the seller's web page through the seller's TRY server, if the buyer knows he/she will purchase the product and wishes to provide rating information, the buyer may retrieve the '900' toll number as well as the '800' toll-free number. Alternatively, the buyer may only retrieve the '900' number while accessing the seller's web page, subsequently purchase the product and after he/she has decided to provide rating information, go back to the seller's web page to retrieve the '800' number.

In the case where the buyer retrieves both of the '900' and '800' numbers during the same connection, the buyer obviously saves the steps of re-connecting and disconnecting from the seller's TRY server and basically one less connection is made.

Score Push or Pull

In FIG. 3, the evaluation is viewed from the TRY server 40, but scoring information is updated and maintained by the BUY server 48 (scoring subsystems) in order to allow crosschecking of the score's Caller ID which is transmitted at the time of the '800' call, against the approved list of Caller ID numbers maintained in the ID table 52. In an alternate embodiment, the list of numbers in ID table 52 may be set to optionally expire upon the passage of a given time period. This may be done in order to avoid an arbitrarily long list of buyer ID numbers stored in ID table 52.

In terms of communicating the updated score or evaluation information from the BUY server 48 to the TRY server 40 (the scoring information is actually stored in score location 300 and accessed by TRY server 40 when needed) for the purpose of providing this information on the Internet, there are at least a couple of options. The scoring information may be communicated to TRY server 40 either at the time of evaluation, that is during or right after the '800' call, or when a new client accesses the TRY server 40. As discussed earlier, the actual communications between BUY and TRY servers depends upon whether the servers are co-located or remotely located from each other.

If TRY and BUY servers exist on the same processor, then there is no preferred communication sequence, since the BUY server can easily update the TRY information, or the TRY server can easily access the updated score. If TRY and BUY servers are remotely located, it is believed that the invocation of the TRY "plug-in" establishes the best time for accessing the latest scoring information from the BUY server, via TCP/IP requests from the plug-in to the server.

These TCP/IP requests may occur by direct connection through telco switches (preferably using Centrex Service) or via Internet access (requiring the scoring subsystem to maintain an internet connection). In any event, the "plug-in" can easily be designed to request the updated score.

On the other hand, it is possible for the BUY server 48 to initiate the process by transmitting TCP/IP (or other) packets to the TRY server 40 when a new scorer causes the score to be updated. This also requires establishing a connection between the TRY and BUY servers as described above. However, a "background" program is also required to be run in the TRY server to access and update the score data for use by the next user who accesses TRY server 40.

Thus, the score can be "pushed" onto the TRY server 40 by the BUY server at the time the score is updated, or the TRY server can "pull" the latest score information from the BUY server 48 at the next invocation of the TRY plug-in by a potential buyer. The "pull" method is believed to be the simplest implementation, readily accomplishable using TCP/IP packets, and requiring only that the TRY requests be delayed by the BUY server if they arrive while a score is being updated.

There are various applications of the system shown in FIG. 3 other than the rating of a product. For example, the system may be used as a secure voting system wherein a voter may download a position paper or voting forms from TRY server 40 through the Internet 36 to his/her subsystem 30. Subsequently, the voter may enter his/her vote by completing the downloaded voting form and the latter is transmitted from the user's (voter's) subsystem to a voting machine such as the BUY server 48 through an '800' telephone connection. Note that voter must have been registered prior to placing the '800' call such that his/her Caller ID number is contained with the ID table (voter list) 52. Upon placing the '800' call, the voter's Caller ID is compared by the BUY server 48 to the list of previously registered voters from the ID table 52 by comparator 306 and if there is a match, the voter's vote is authorized for counting and may be stored in scoring location 300. Upon the transmission of the voter's vote to the BUY server 48 (voting machine 48), the voter's Caller ID number is erased from the table ID 52. This again ensures security in terms of allowing only one vote per registered voter.

Voting applications of the present invention may be utilized by a corporation or the government. It could further be used for radio or television polls wishing to limit voters to a prescribed calling area.

Additionally, the present invention may be used to provide purchasers of stock with secure voting ability from a remote site thereby eliminating the need for the shareholder's presence or absentee ballots in order to vote. It should be apparent that the applications of the present invention are wide ranging and too numerous to completely list.

In yet another alternative embodiment, referring to FIG. 3, the '800' toll-free number need not be necessarily retrieved through the Internet 36. This number may be posted in places other than the Internet so long as the user is able to access it.

Although the present invention has been described in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What I claim is:

1. A method of providing secure communication of private information to a remote subsystem through electronic media comprising:

providing a local subsystem disposed at a local location and accessible to a user, said local subsystem being responsive to user input information and being operative to generate local communication data, and being operative to receive remote communication data, said local subsystem having an identifying number associated therewith for transmission to a remote subsystem with said communication data;

providing a remote subsystem located remotely from said local subsystem for receiving said local communication data and for receiving and storing said identifying number, and for generating remote communication data;

developing score rating information for storage in the remote subsystem, such storage information being communicatable to a user at said local subsystem upon request;

establishing a first communication link between the local subsystem and the remote subsystem, said first communication link being operative to communicate said identifying number to the remote subsystem for storage;

communicating said local communication data from said local subsystem to said remote subsystem, and communicating said identifying number to said remote subsystem via said first communication link;

storing said identifying number in said remote subsystem;

communicating remote communication data including a telephone toll-free number through said first communication link from said remote subsystem to said local subsystem;

using said toll-free number to establish a second communication link between said local subsystem and said remote subsystem, said second communication link being a toll free telephone connection, and being operative to again communicate said identifying number to said remote subsystem; and comparing the identifying number communicated from said local subsystem through said second communication link to said remote subsystem to the identifying number stored in the remote subsystem to verify that the second communication link is established between said remote subsystem and said local subsystem, whereupon a user at said local subsystem will be allowed to communicate his/her private information to the remote subsystem; and transmitting private information from the local subsystem, including an evaluation relating to the degree of the user's satisfaction with a product, to the remote subsystem through said second communication link, and in response thereto determining a new score rating associated with the selected product based on the transmitted evaluation and a previous rating stored in said remote subsystem.

2. A method of providing secure communication as recited in claim 1, wherein the toll-free telephone number is from an 800 telephone numbering system.

3. A method of providing secure communication as recited in claim 2, wherein said local subsystem further includes a monitor for displaying said scoring information.

4. A method of providing secure communication as recited in claim 3, wherein said scoring information includes x-y coordinate data from which a graph can be displayed indicating the degree of satisfaction of users of said product with the said product.

5. A method of providing secure communication as recited in claim 4, wherein said monitor further displays options selectable by the user from the group consisting of trying said product, purchasing said product, and evaluating said product.

6. A method of providing secure communication as recited in claim 3, wherein said scoring information includes iconic representation of the degree of satisfaction of users of the identified product with the identified product.

7. A method of providing secure communication of commercial transaction data and for securely communicating rating information relating to consumer satisfaction, comprising:

providing a local subsystem disposed at a local location and accessible to a consumer, said local subsystem being responsive to consumer input information and operative to generate local communication data, and being operative to receive remote communication data, said local subsystem having an identifying number associated therewith for transmission to a remote subsystem;

providing a remote subsystem located remotely from said local subsystem for receiving said local communication data, and for receiving and storing said identifying number, and for generating said remote communication data, said remote location having at least one identifiable product remotely selectable by the consumer;

establishing a first communication link between the local subsystem and the remote subsystem;

selecting at least one of said identifiable products through the first communication link;

communicating remote communication data including a telephone toll number and a telephone toll-free number associated with the selected product through said first communication link from the remote subsystem to the local subsystem;

using the retrieved toll number to establish a second communication link between the local subsystem and the remote subsystem, said second communication link being a telephone toll connection and being operative to transfer said identifying number associated with said local subsystem to said remote subsystem;

storing the transferred identifying number in the remote subsystem;

purchasing the selected product through said second communication link;

evaluating the selected product;

using the toll-free number to establish a third communication link between said local subsystem and said remote subsystem, said third communication link being a toll-free telephone connection, and again transferring said identifying number associated with said local subsystem to said remote subsystem; and comparing the identifying number transferred through said third communication link to the identifying number stored in the remote subsystem to verify that the third communication link is between said remote subsystem and said local subsystem, whereupon the consumer will be allowed to communicate his/her evaluation to the remote subsystem.

8. A method as recited in claim 7 wherein said first and third communication links are established through the Internet transmission media and said second communication link is established through a direct transmission media.

9. A method as recited in claim 8 further including:

maintaining a history of previous rating information in said remote subsystem; and transmitting the user's evaluation from said local subsystem to said remote subsystem through the third communication link, wherein said remote subsystem determines a new score rating associated with the selected product based on the transmitted evaluation and said previous rating information.

10. A method of providing secure communication as recited in claim 7, wherein the toll-free telephone number is from an 800 telephone numbering system.

11. A method of providing secure communication as recited in claim 7, wherein said local subsystem further includes a monitor for displaying said scoring information.

12. A method of providing secure communication as recited in claim 11, wherein displayed scoring information includes x-y coordinate data from which a graph can be displayed indicating the degree of satisfaction of users of the identifiable product with the identified product.

13. A method of providing secure communication as recited in claim 12, wherein said monitor further displays options selectable by the user from the group consisting of trying the identifiable product, purchasing the identifiable product and evaluating the identifiable product.

14. A remote communication system for securing electronic purchases of digital information including means for permitting a user of a purchased product to subsequently rate the purchased product comprising:

a local subsystem disposed at a local location and accessible to a user, said local subsystem being responsive to a user input and operative to generate communication data corresponding thereto, said local subsystem being identifiable by a caller ID number;

means establishing a first communication link for communicating said communication data to a remote location;

a remote subsystem located at said remote location for receiving said communication data and in response thereto transmitting a telephone toll number and a toll-free telephone number associated with a product selected by the user back through said first communication link to said local subsystem, said remote subsystem including means for transferring an ordered product from said remote subsystem to said local subsystem;

means for storing caller ID numbers transmitted thereto;

comparison means for comparing a received caller ID number to the stored caller ID numbers to recognize a particular caller ID when a toll-free number is subsequently used to contact said remote subsystem;

means using the transmitted toll number to establish a second communication link between said local subsystem and said remote subsystem through which the selected product may be ordered, said second communication link transmitting a caller ID number identifying said local subsystem to said remote subsystem; and means using said toll-free number to establish a third communication link between said local subsystem and said remote subsystem whereupon said caller ID is recognized by said comparison means and whereupon being recognized, the user will be permitted to communicate an evaluation of said selected product to said remote subsystem.

15. A remote communication system as recited in claim 14, wherein the toll-free telephone number is from an 800 telephone numbering system.

16. A remote communication system as recited in claim 15, wherein said local subsystem further includes a monitor for displaying said scoring information.

17. A remote communication system as recited in claim 16, wherein said displayed scoring information includes x-y coordinate data from which a graph can be displayed indicating the degree of satisfaction of users of the identifiable product with the identified product.

18. A remote communication system as recited in claim 17, wherein said displayed scoring information includes an iconic representation indicating the degree of satisfaction of users of the identified product with the identified product.

19. A remote communication system as recited in claim 16, wherein said monitor further displays options selectable by the user from the group consisting of trying the identifiable product, purchasing the identifiable product and evaluating the identifiable product.

20. A remote communication system as recited in claim 14, wherein said first communication link uses the Internet transmission media.

21. A remote communication system as recited in claim 14 wherein said remote subsystem further includes means for determining that this product ordered via said second communication link corresponds to said toll number.

* * * * *